US012762893B2

(12) United States Patent
Koo et al.

(10) Patent No.: US 12,762,893 B2
(45) Date of Patent: Oct. 13, 2026

(54) ELECTRONIC DEVICE FOR OBTAINING FEATURE POINT FROM CODED IMAGE AND METHOD FOR OPERATING THE SAME

(71) Applicant: SAMSUNG ELECTRONICS CO., LTD., Suwon-si (KR)

(72) Inventors: Bonkon Koo, Suwon-si (KR); Youngmo Jeong, Suwon-si (KR); Jongchul Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 449 days.

(21) Appl. No.: 18/208,102

(22) Filed: Jun. 9, 2023

(65) Prior Publication Data

US 2023/0401893 A1 Dec. 14, 2023

Related U.S. Application Data

(63) Continuation of application No. PCT/KR2023/006546, filed on May 15, 2023.

(30) Foreign Application Priority Data

Jun. 9, 2022 (KR) ........................ 10-2022-0070341
Sep. 27, 2022 (KR) ........................ 10-2022-0122866

(51) Int. Cl.
*G06V 40/18* (2022.01)
*G06F 3/01* (2006.01)
(Continued)

(52) U.S. Cl.
CPC ............ *G06V 40/193* (2022.01); *G06F 3/013* (2013.01); *G06T 7/50* (2017.01); *G06V 40/197* (2022.01); *G06V 2201/07* (2022.01)

(58) Field of Classification Search
CPC ............... G06V 40/193; G06V 40/197; G06V 2201/07; G06T 7/50; G06F 3/013
See application file for complete search history.

(56) References Cited

U.S. PATENT DOCUMENTS 8,066,375 B2 11/2011 Skogo et al.
9,100,575 B2 8/2015 Lee et al.
(Continued)

FOREIGN PATENT DOCUMENTS

JP 6-133931 A 5/1994
JP 2001-339741 A 12/2001
(Continued)

OTHER PUBLICATIONS

Tseng, Ethan et al., "Neural nano-optics for high-quality thin imaging", Nature Communications, 2021, vol. 12, No. 6493, https://doi.org/10.1038/s41467-021-26443-01, www.nature.com/naturecommumcations. (7 pages total).
(Continued)

*Primary Examiner* — Oneal R Mistry
*Assistant Examiner* — Nhut Huy Pham
(74) *Attorney, Agent, or Firm* — Sughrue Mion, PLLC

(57) ABSTRACT

An electronic device includes a light source configured to output light, a pattern mask configured to change a path of light transmitted through a pattern of the pattern mask, an image sensor configured to receive light that is output from the light source, reflected by an eye, and transmitted through the pattern mask, and at least one processor configured to obtain a coded image that is phase-modulated based on light transmitted through the pattern mask, obtain a feature point of the eye from the coded image, and obtain gaze information of a user based on the feature point.

20 Claims, 16 Drawing Sheets

(51) Int. Cl.

| | |
|---|---|
| ***G06F 21/32*** | (2013.01) |
| ***G06T 7/50*** | (2017.01) |
| ***G06V 10/145*** | (2022.01) |
| ***G06V 10/82*** | (2022.01) |

(56) References Cited

U.S. PATENT DOCUMENTS

| | | | | |
|---|---|---|---|---|
| 9,202,280 | B2 | 12/2015 | Wu et al. | |
| 9,545,200 | B2 | 1/2017 | Catanzariti et al. | |
| 10,133,349 | B2 | 11/2018 | Kim et al. | |
| 10,983,341 | B2 | 4/2021 | Geng et al. | |
| 11,150,469 | B2 | 10/2021 | Petljanski et al. | |
| 11,263,419 | B2 | 3/2022 | Chang Lee | |
| 2008/0284980 | A1 | 11/2008 | Skogo et al. | |
| 2014/0313308 | A1 | 10/2014 | Wang et al. | |
| 2015/0131055 | A1 | 5/2015 | Catanzariti et al. | |
| 2015/0316983 | A1 | 11/2015 | Park et al. | |
| 2019/0056599 | A1* | 2/2019 | Reshidko | G02B 27/0172 |
| 2019/0102595 | A1* | 4/2019 | Lee | G06V 40/1318 |
| 2019/0235248 | A1 | 8/2019 | Ollila et al. | |
| 2019/0278987 | A1* | 9/2019 | Eskilsson | G02B 27/0093 |
| 2020/0201034 | A1 | 6/2020 | Geng et al. | |
| 2020/0379214 | A1* | 12/2020 | Lee | G02B 27/0179 |
| 2022/0100268 | A1 | 3/2022 | Weinberg et al. | |
| 2022/0197380 | A1 | 6/2022 | Tokubo et al. | |
| 2024/0028117 | A1* | 1/2024 | Tesdahl | G02B 27/0172 |
| 2024/0153104 | A1 | 5/2024 | Lee et al. | |

FOREIGN PATENT DOCUMENTS

| | | | | |
|---|---|---|---|---|
| JP | 2004-280537 A | 10/2004 | | |
| KR | 10-2014-0029933 A | 3/2014 | | |
| KR | 10-2014-0125713 A | 10/2014 | | |
| KR | 10-1541881 B1 | 8/2015 | | |
| KR | 10-1601541 B1 | 3/2016 | | |
| KR | 10-2016-0061691 A | 6/2016 | | |
| KR | 10-1737087 B1 | 5/2017 | | |
| KR | 10-2017-0092165 A | 8/2017 | | |
| KR | 10-1891786 B1 | 8/2018 | | |
| KR | 10-2021-0047486 A | 4/2021 | | |
| KR | 10-2021-0117062 A | 9/2021 | | |
| KR | 10-2021-0122271 A | 10/2021 | | |
| KR | 10-2023-0065467 A | 5/2023 | | |
| WO | WO-2016142489 A1 * | 9/2016 | | G06V 40/18 |

OTHER PUBLICATIONS

Tseng, Ethan et al., "Differentiable Compound Optics and Processing Pipeline Optimization for End-to-end Camera Design", ACM Transactions on Graphics, vol. 40, No. 2, Article 18. Publication date: Jun. 2021, pp. 18:1-18:19.

Robidoux, Nicolas et al., "End-to-end High Dynamic Range Camera Pipeline Optimization" Supplemental Document, 2021. (17 pages total).

Peng, Yifan et al., "Learned Large Field-of-View Imaging With Thin-Plate Optics", ACM Transactions on Graphics, vol. 38, No. 6, Article 1, Publication date: Nov. 2019, pp. 1:1-1:14. (15 pages total).

Sitzmann, Vicent et al., "End-to-end Optimization of Optics and Image Processing for Achromatic Extended Depth of Field and Super-resolution Imaging", ACM Trans. Graph., vol. 37, No. 4. Article 114. Publication date: Aug. 2018, pp. 114:1-114:13.

Hong, Su-Min et al., "Specification and Limitation of ToF Cameras", 2016. (5 pages total).

"Introduction to eye-tracking technology", DBpia, The Magazine of the IEEE, 2018, vol. 45, No. 8, http://www.dbpia.co.kr/journal/articleDetail?nodeld=NODE07518734. (12 pages total).

"Tobii Pro Glasses 2 User's Manual", Tobii Pro, Dec. 2016, Version 1.1.3. (58 pages total).

International Search Report and Written Opinion (PCT/ISA/220, PCT/ISA/210, and PCT/ISA/237) dated Aug. 1, 2023, issued by International Searching Authority for International Application No. PCT/KR2023/006546.

Sheela et al., "Iris detection for gaze tracking using video frames", 2015 IEEE International Advance Computing Conference (IACC), Jun. 12, 2015, pp. 629-633, XP033172931, doi:10.1109/IADCC.2015.7154783.

Chi et al., "Phase-coded aperture for optical imaging", Optics Communications, Jun. 1, 2009, pp. 2110-2117, vol. 282, XP026038725, doi:10.1016/J.OPTCOM.2009.02.031.

Communication dated Jun. 2, 2025, issued by European Patent Office in European Patent Application No. 23820008.3.

Communication issued Jul. 28, 2026 by the European Patent Office in European Patent Application No. 23820008.3.

Gill, Patrick et al., "Lensless Smart Sensors: Optical and Thermal Sensing for the Internet of Things", 2016 Symposium on VLSI Circuits, Digest of Technical Papers, IEEE, Jun. 15, 2016, XP032969264. (2 pages total).

* cited by examiner

ELECTRONIC DEVICE FOR OBTAINING FEATURE POINT FROM CODED IMAGE AND METHOD FOR OPERATING THE SAME

CROSS-REFERENCE TO RELATED APPLICATION(S)

This application is a continuation of International Application No. PCT/KR2023/006546, filed on May 15, 2023, in the Korean Intellectual Property Receiving Office, which is based on and claims priority to Korean Patent Application No. 10-2022-0122866, filed on Sep. 27, 2022, in the Korean Intellectual Property Office, and Korean Patent Application No. 10-2022-0070341, filed on Jun. 9, 2022, in the Korean Intellectual Property Office, the disclosures of which are incorporated herein by reference in their entireties.

BACKGROUND

1. Field

The disclosure generally relates to an electronic device for obtaining a feature point from a coded image, and a method for operating the same.

2. Description of Related Art

Recently, in various applications using an augmented reality (AR) or virtual reality (VR) device, information about a gaze direction of a user wearing the device is often required. Gaze direction information may be used in various operations such as an operation of constructing a user interface, an operation of optimizing rendering of an image provided to a user (e.g., foveated rendering), or an operation of determining a distance to an object a user is looking at. Gaze direction information may be generated by an eye-tracking (ET) sensor of a user.

However, a camera system for tracking a gaze often includes a bulky lens assembly, and efforts have been made to miniaturize an AR device on which a camera system is mounted without degrading performance.

Also, in a related art camera system, after an optical system including lenses is designed, parameters in an image processing algorithm may be adjusted to output a clearer image.

SUMMARY

Provided is an electronic device for extracting a feature point from an image distorted while being transmitted through a pattern mask and tracking a gaze based on the feature point, and an operating method of the electronic device.

Additional aspects will be set forth in part in the description which follows and, in part, will be apparent from the description, or may be learned by practice of the presented embodiments.

According to an aspect of the disclosure, an electronic device may include a light source configured to output light, a pattern mask configured to change a path of light transmitted through a pattern of the pattern mask, an image sensor configured to receive light that is output from the light source, reflected by an eye, and transmitted through the pattern mask, and at least one processor configured to obtain a coded image that is phase-modulated based on light transmitted through the pattern mask, obtain a feature point of the eye from the coded image, and obtain gaze information of a user based on the feature point.

The feature point may include information about at least one of position coordinates of the eye and a shape of the eye.

The feature point may include at least one of a pupil feature point and a glint feature point.

The at least one processor may be further configured to reconstruct an original image of the eye from the coded image and obtain authentication information of the user based on the original image.

The at least one processor may be further configured to identify iris information of the user based on the original image and obtain the authentication information based on the identified iris information.

The at least one processor may be further configured to obtain process determination information based on a situation of the user and based on the process determination information, selectively obtain the gaze information of the user or the authentication information of the user.

The image sensor may include a time of flight (TOF) sensor configured to obtain depth information based on received light and the at least one processor may be further configured to obtain the coded image, based on light transmitted through the pattern mask and received through the TOF sensor.

The coded image obtained based on the light received through the TOF sensor may include depth information corresponding to the eye, and the coded image may include an image modulated by the pattern mask.

The image sensor may include a TOF sensor configured to obtain depth information and a light sensor configured to obtain an image of a target object, and the at least one processor may be further configured to obtain a first coded image based on light transmitted through the pattern mask and received through the TOF sensor, obtain a second coded image, based on light transmitted through the pattern mask and received by the light sensor, and obtain the feature point, based on at least one of the first coded image and the second coded image.

The electronic device may include an artificial intelligence (AI) model configured to extract a feature point from an image that is phase-modulated by the pattern of the pattern mask, and the at least one processor may be further configured to obtain the feature point from the coded image, using the AI model.

According to an aspect of the disclosure, a non-transitory, computer-readable storage medium may store instructions that, when executed by at least one processor, cause the at least one processor to obtain a coded image that is phase-modulated, based on light reflected by an eye transmitted through a pattern mask and received through an image sensor, obtain a feature point of the eye from the coded image, and obtain gaze information of a user based on the feature point.

According to an aspect of the disclosure, a method may include obtaining a coded image that is phase-modulated, based on light reflected by an eye and transmitted through a pattern mask and received through an image sensor, obtaining a feature point of the eye from the coded image, and obtaining gaze information of a user based on the feature point.

The feature point may include information about at least one of position coordinates and a shape of the eye.

The feature point may include at least one of a pupil feature point and a glint feature point.

The method may include reconstructing an original image of the eye from the coded image and obtaining authentication information of the user based on the original image.

The obtaining of the authentication information of the user may include identifying iris information of the user based on the original image and obtaining the authentication information based on the identified iris information.

The method may include obtaining process determination information based on a situation of the user and based on the process determination information, selectively obtaining the gaze information or the authentication information of the user.

The image sensor may include a TOF sensor configured to obtain depth information by receiving light, and the obtaining of the coded image may include obtaining the coded image, based on light transmitted through the pattern mask and received through the TOF sensor.

The coded image obtained based on the light received through the TOF sensor may include depth information corresponding to the eye and the coded image may include an image modulated by the pattern mask.

The image sensor may include a TOF sensor configured to obtain depth information and a light sensor configured to obtain an image of a target object, the obtaining of the coded image may include obtaining a first coded image based on light transmitted through the pattern mask and received through the TOF sensor and obtaining a second coded image, based on light transmitted through the pattern mask and received through the light sensor, and the obtaining of the feature point may include obtaining the feature point, based on at least one of the first coded image and the second coded image.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
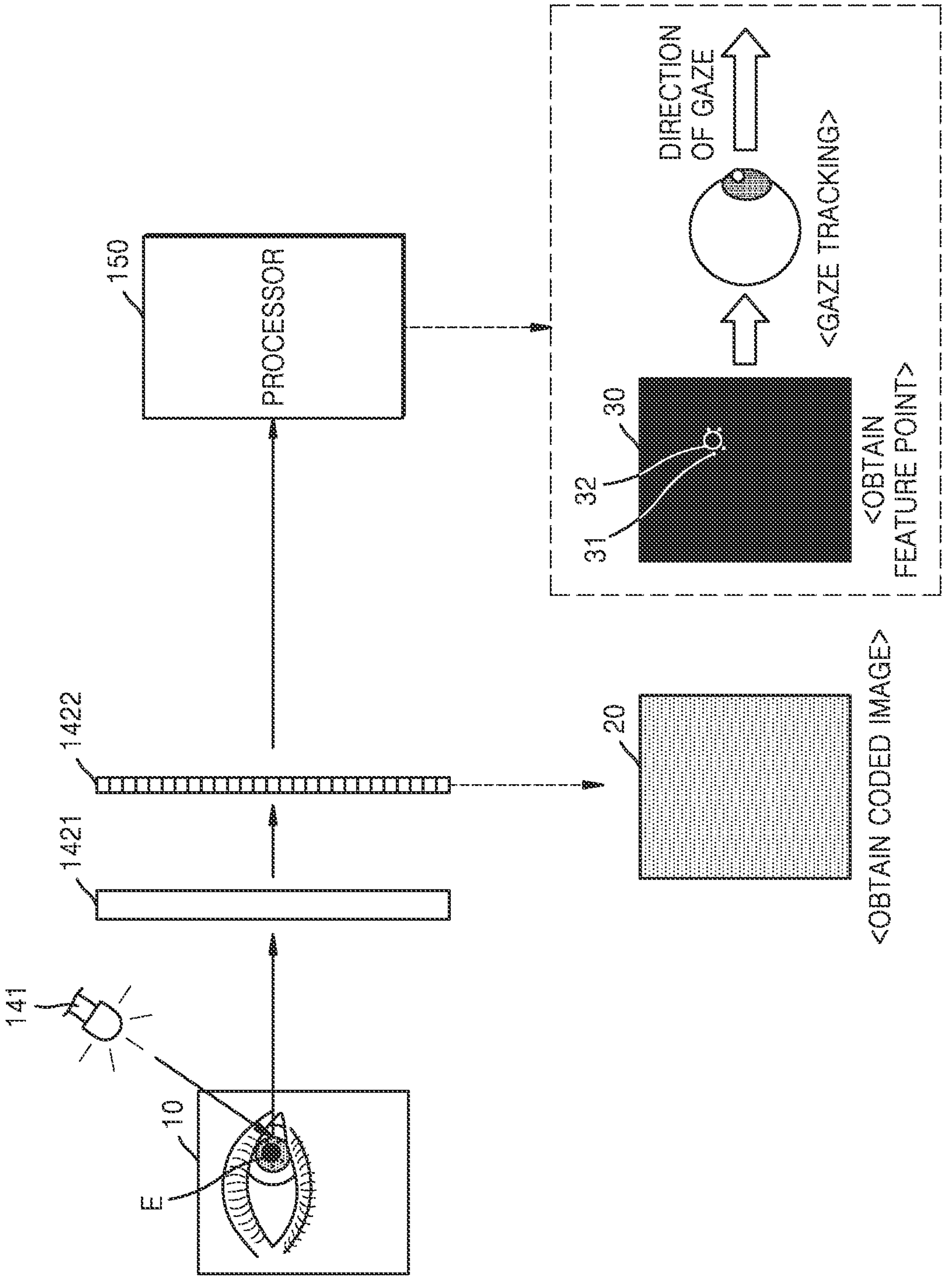
FIG. 1 is a diagram illustrating an operation in which an electronic device obtains a coded image using a pattern mask and extracts a feature point from the obtained coded image, according to an embodiment of the disclosure.

Throughout the disclosure, the expression "at least one of a, b or c" indicates only a, only b, only c, both a and b, both a and c, both b and c, all of a, b, and c, or variations thereof.

The terms used herein are those general terms currently widely used in the art in consideration of functions in the disclosure but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the disclosure.

An expression used in the singular may encompass the expression in the plural, unless it has a clearly different meaning in the context. Terms used herein, including technical or scientific terms, may have the same meaning as commonly understood by one of ordinary skill in the art described in the disclosure.

When a part "includes" or "comprises" an element, unless there is a particular description contrary thereto, the part may further include other elements, not excluding the other elements. Also, the term such as "... unit" or "... module" refers to a unit that performs at least one function or operation, and the unit may be implemented as hardware or software or as a combination of hardware and software.

The expression "configured (or set) to" used in the disclosure may be replaced with, for example, "suitable for," "having the capacity to," "designed to," "adapted to," "made to," or "capable of" according to a situation. The term "configured (or set) to" does not always mean only "specifically designed to" by hardware. Alternatively, in some situations, the expression "system configured to" may mean that the system is "capable of" operating together with another apparatus or component. For example, "a processor configured (or set) to perform A, B, and C" may be a dedicated processor (e.g., an embedded processor) for performing a corresponding operation or a generic-purpose processor (such as a central processing unit (CPU) or an application processor) that may perform a corresponding operation by executing at least one software program stored in a memory.

Also, in the disclosure, it will be understood that when elements are "connected" or "coupled" to each other, the elements may be directly connected or coupled to each other, but may alternatively be connected or coupled to each other with an intervening element therebetween, unless specified otherwise.

The disclosure will now be described more fully with reference to the accompanying drawings for one of ordinary skill in the art to be able to perform the disclosure without any difficulty. However, the disclosure may be embodied in many different forms and is not limited to the embodiments of the disclosure set forth herein.

Hereinafter, embodiments of the disclosure will be described in detail with reference to the drawings.

FIG. 1 is a diagram illustrating an operation in which an electronic device obtains a coded image using a pattern mask and extracts a feature point from the obtained coded image, according to an embodiment of the disclosure.

Referring to FIG. 1, the electronic device may include a light source 141, a pattern mask 1421, and an image sensor 1422.

The light source 141 may output light. The light source 141 may be, for example, an infrared light source that emits infrared rays. The light source 141 may be a light source that may emit infrared rays having a wavelength of 750 nm to 1 mm. However, a type of the light source 141 is merely an example, and the disclosure is not limited thereto. For example, the light source 141 may be one of an ultraviolet light source, an X-ray light source, and a gamma-ray light source. In general, the light source 141 may include a light-emitting diode (LED), or may include a light-emitting device including one LED or a plurality of LEDs.

The pattern mask 1421 may be a mask on which a pattern is formed. A path of transmitted light may be changed according to the pattern of the pattern mask 1421. For example, light transmitted through the pattern mask 1421 may be light output from the light source 141.

The pattern mask 1421 may have a pattern formed through a scratch that causes a thickness difference. That is, for example, when the pattern mask 1421 includes a plastic material, a pattern may be formed by intentionally causing a scratch on a plastic surface. However, a material of the pattern mask 1421 is merely an example, and the disclosure is not limited thereto. The pattern formed on the pattern mask 1421 will be described in detail with reference to FIGS. 7 to 9.

The image sensor 1422 may obtain a coded image 20, by receiving light transmitted through the pattern mask 1421. Light transmitted through the pattern mask 1421 may be light output from the light source 141 and reflected by an object. As shown in FIG. 1, light transmitted through the pattern mask 1421 may be light reflected from an eye E. The light reflected by the eye E may reach the pattern mask 1421 and a path of the light may be changed by the pattern mask 1421 to modulate a phase.

The light that is phase-modulated is received by the image sensor 1422. For example, the image sensor 1422 may be a two-dimensional (2D) array of sensors including a plurality of pixels that are arranged in a matrix, and each of the plurality of pixels may include at least one photoelectric conversion element. The image sensor 1422 may detect light using the photoelectric conversion element, and may output an image signal that is an electrical signal according to the detected light. The electronic device 100 may obtain the coded image 20 by converting light received through the image sensor 1422 into an electrical signal.

Although an object from which light output from the light source 141 is reflected is a part of a face of a user including the eye, this is merely an example, and the disclosure is not limited thereto. For example, an object from which output light is reflected may be a solid object (e.g., a laptop computer, a fan, or an umbrella), and or may be another body part (e.g., a hand, a foot, or a knee) of the user other than the face.

The electronic device may obtain the coded image 20 based on light received by the image sensor 1422. The electronic device may obtain the coded image 20 that is phase-modulated, by receiving light transmitted through the pattern mask 1421 through the image sensor 1422.

Data obtained by the image sensor 1422 as light output from the light source 141 is transmitted through the pattern mask 1421 may be coded image data. The coded image 20 may vary according to at least one of an object image 10, that is, an object from which light output from the light source 141 is reflected or a pattern shape of the pattern mask 1421. In general, the object represented in the coded image 20 that is phase-modulated by the pattern mask 1421 may be difficult to be identified with naked eyes.

The object image 10 may include an object. Although the object is the eye E of the user in FIG. 1, the is merely an example, and the disclosure is not limited thereto. For example, the object may refer to any object to be recognized by the electronic device such as a laptop computer, a mobile phone, or a coffee.

The electronic device may obtain a feature point 30 from the coded image 20, using a processor 150. The processor 150 may include an artificial intelligence (AI) algorithm or an AI network for obtaining the feature point 30. The AI algorithm included in the processor 150 may be an algorithm trained to extract the feature point 30 from a modulated image, that is, the coded image 20.

The processor 150 may obtain the coded image 20 processed by the image sensor 1422. The processor 150 may obtain the feature point 30 corresponding to an object from the coded image 20.

The object may refer to an object to be detected. For example, when a gaze is to be tracked, the object may include at least one of a pupil or an eye glint. In another example, when a position of a specific object is to be recognized, the object may be a laptop computer, a fan, an umbrella, or a pencil whose position is to be recognized.

The disclosure is not limited to an output information type of the feature point 30.

For example, the feature point 30 may be output as an image. In this case, a data amount of the feature point 30 may be determined based on a size of an image, the number of colors, and whether there are a glint and a pupil.

In a specific example, a data amount of the feature point 30 may be 320*240*1*2 bits. Although the feature point 30 that is an image has a resolution of 320*240, this is merely an example, and the disclosure is not limited thereto. Also, because the feature point 30 that is an image may be expressed in a single color, a data amount of the feature point 30 may be a value multiplied by 1. Also, the feature point 30 that is an image may be stored as 2 bits to indicate whether it is an area including a glint, a pupil, or both a glint and a pupil.

In another example, the feature point 30 may be output as data including a pupil image and glint coordinates. In this case, a data amount of the feature point may be determined based on a size of the pupil image, the number of colors of the pupil image, whether there is a pupil, and the number of glints.

In a specific example, a data amount of the feature point 30 may be 320*240*1*1 bits+N*2*8 bits. A data amount of the pupil image may be 320*240*1*1 bits, and a data amount of the glint coordinates may be N*2*8 bits. Although the pupil image has a resolution of 320*240, this is merely an example, and the disclosure is not limited thereto. Also, because the pupil image may be expressed in a single color, a data amount of the pupil image may be a value multiplied by 1. A data amount of the pupil image may be stored as 1 bit to indicate whether it is an area including a pupil. A data amount of the glint coordinates may be calculated by multiplying the number of glints N, two coordinate values (i.e., x and y coordinates in a 2D coordinate system), and 8 bits representing each coordinate.

In another example, the feature point 30 may be output as data including pupil parameters and glint coordinates. In this case, a data amount of the feature point may be determined based on the number of pupil parameters and the number of glints.

In a specific example, a data amount of the feature point 30 may be 5*8 bits+N*2*8 bits. A data amount of the pupil parameters may be 5*8 bits, and a data amount of the glint coordinates may be N*2*8 bits. The pupil parameters may be calculated by multiplying five parameters according to an elliptic equation and 8 bits representing each parameter. A detailed description of the pupil parameters will be provided below using Equation (1). A data amount of the glint coordinates may be calculated by multiplying the number of glints N, two coordinate values (i.e., x and y coordinates in a 2D coordinate system), and 8 bits representing each coordinate.

The feature point 30 may include at least one of a pupil feature point 32 or a glint feature point 31.

The glint feature point 31 may be data that may be represented as a point. The glint feature point 31 may be data on a position coordinate value of a glint of the eye.

In an embodiment of the disclosure, a glint of the eye may refer to reflected light detected as light output from the light source 141 is reflected by the eye and then is received by the image sensor 1422. The glint feature point 31 may include data on a position coordinate value of a glint of the eye. The glint feature point 31 may be a portion having a brightness equal to or greater than of a predetermined value in a detected area of the eye.

The pupil feature point 32 may be data on a shape of a pupil.

The pupil may have an elliptical shape. The elliptical shape of the pupil may be described according to Equation (1).

$$\frac{(x-x_0)^2}{a^2}+\frac{(y-y_0)^2}{b^2}=1 \qquad (1)$$

In Equation (1), a and b are parameters related to a major axis and a minor axis of an ellipse. When a>b>0, a length of the major axis is 2a, and a length of the minor axis is 2b. When b>a>0, a length of the major axis is 2b, and a length of the minor axis is 2a.

In Equation (1), $x_0$ and $y_0$ are parameters related to a position of the ellipse. That is, $(x_0, y_0)$ are coordinates of the center of the ellipse.

To include information about the shape of the pupil, the pupil feature point 32 may include numerical values (i.e., pupil parameters corresponding to a, b, $x_0$, and $y_0$).

In addition, to represent a rotated elliptical shape, the pupil feature point 32 may include a numerical value (e.g., 0) of a rotation angle. Accordingly, the pupil feature point 32 may include numerical values corresponding to a, b, $x_0$, $y_0$, and θ. The pupil feature point 32 may represent data on all types of ellipse through numerical values corresponding to a, b, $x_0$, $y_0$, and θ.

That is, the electronic device according to an embodiment of the disclosure may output the glint feature point 31 that may be represented as a position coordinate value and the pupil feature point 32 that may be represented as data on an ellipse (i.e., numerical values corresponding to a, b, $x_0$, $y_0$, and θ) according to Equation (1). Because output feature points are represented as minimum numerical values, the output feature points may have a small data amount. Because the electronic device according to an embodiment of the disclosure extracts only a feature point having a small data amount from the coded image 20, a calculation speed may be increased.

The electronic device according to an embodiment of the disclosure may track a gaze of the user, based on the obtained feature point. The electronic device may determine a direction of the gaze of the user. The electronic device may track the gaze of the user by considering a position and a shape of the feature point.

Figure 2:
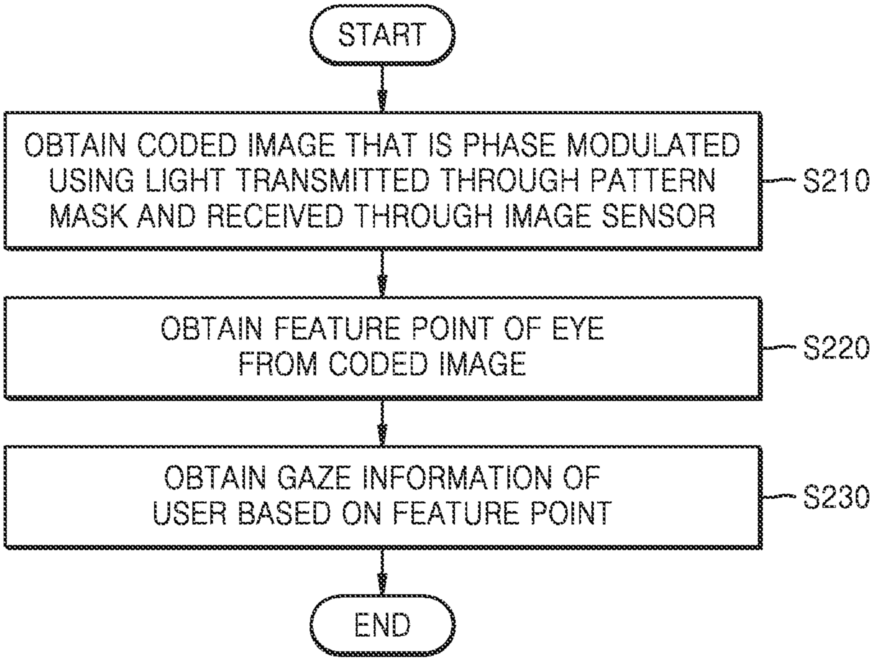
FIG. 2 is a flowchart illustrating an operating method of an electronic device, according to an embodiment of the disclosure.

FIG. 2 is a flowchart illustrating an operating method of an electronic device, according to an embodiment of the disclosure.

Referring to FIG. 2, in operation S210, an electronic device according to an embodiment of the disclosure may obtain a coded image that is phase-modulated using light transmitted through a pattern mask and received through an image sensor.

The electronic device may output light using a light source. The output light may be reflected from an object and may be transmitted through the pattern mask. The output light may be modulated while being transmitted through the pattern mask. The electronic device may receive the light transmitted through the pattern mask using the image sensor. The electronic device may obtain a coded image by converting information about a luminance or an intensity of the received light into an electrical signal.

The light received by the image sensor may refer to light output from the light source, reflected by the object, and transmitted through the pattern mask to change a path.

In operation S220, the electronic device according to an embodiment of the disclosure may obtain a feature point of an eye from the coded image.

A processor of the electronic device may include an AI algorithm or an AI network for obtaining a feature point from the coded image. In an embodiment of the disclosure, the AI algorithm or the AI network may be an AI model including a feature point extraction algorithm.

The electronic device may obtain a feature point of the eye from the coded image using the processor. To obtain a feature point, the processor of the electronic device may use an AI model including a feature point extraction algorithm. The disclosure is not limited to a feature point output information type, and the feature point may be output as, for example, information including a pupil image and glint coordinates.

In operation S230, the electronic device according to an embodiment of the disclosure may obtain gaze information of a user based on the feature point. For example, when an object to be recognized is the user's eye, gaze information of the user may be obtained based on a position, shape, and arrangement of the feature point of the eye.

Figure 3:
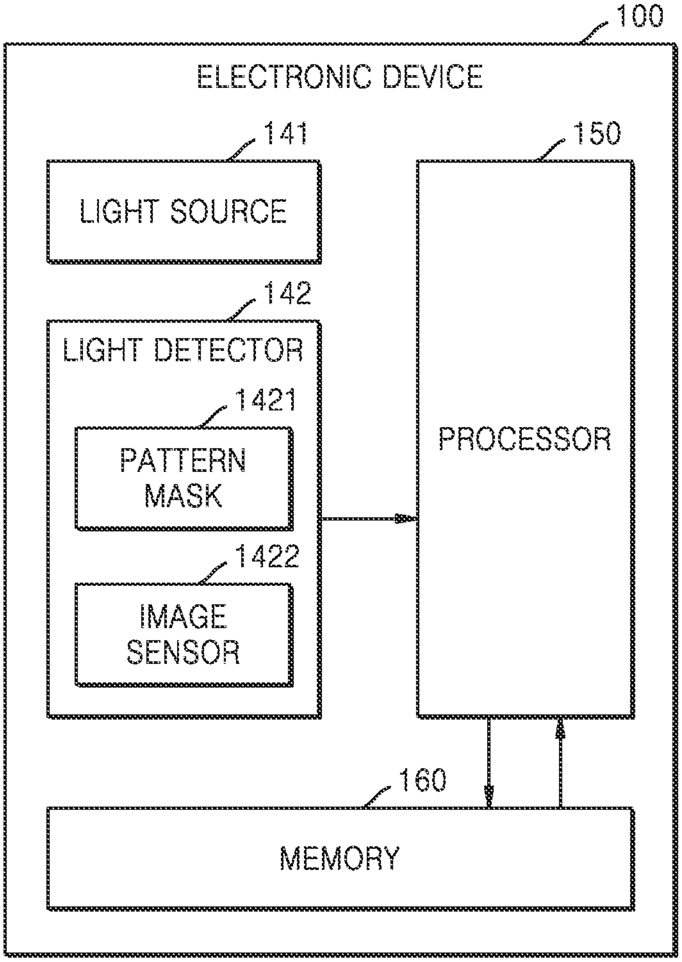
FIG. 3 is a diagram illustrating elements of an electronic device, according to an embodiment of the disclosure.

FIG. 3 is a diagram illustrating elements of an electronic device, according to an embodiment of the disclosure.

For convenience of explanation, the same description as that made with reference to FIGS. 1 and 2 will be briefly provided or omitted.

The electronic device 100 may be a device for obtaining an image by imaging a real object using a camera including the light source 141 and a light detector 142. The electronic device 100 may be any of various devices such as a mobile device, a smartphone, a laptop computer, a desktop, a tablet PC, a wearable device, an electronic book terminal, a digital broadcasting terminal, a personal digital assistant (PDA), a portable multimedia player (PMP), a navigation device, an MP3 player, or a camcorder. In an embodiment of the disclosure, the electronic device 100 may be an augmented reality (AR) device. Also, an 'AR device' may be a device capable of representing 'AR', and may include, as well as AR glasses that a user wears generally on his/her face, a head mounted display (HMD) apparatus that is mounted on a head, an AR helmet, etc.

Referring to FIG. 3, the electronic device 100 may include the light source 141, the light detector 142, the processor 150, and a memory 160. The light detector 142 may include the pattern mask 1421 and the image sensor 1422. The pattern mask 1421, the image sensor 1422, the processor 150, and the memory 160 may be electrically and/or physically connected to each other.

Elements shown in FIG. 3 may be merely an example, and elements included in the electronic device 100 are not limited those illustrated in FIG. 3. The electronic device 100 may include more or fewer elements than those illustrated in FIG. 3. For example, the electronic device 100 may further include a power supply unit (e.g., a battery) for supplying driving power to the light source 141, the pattern mask 1421, the image sensor 1422, the processor 150, and the memory 160.

In another example, the electronic device 100 may further include a low resolution light detection and ranging sensor or a time of flight (TOF) sensor for obtaining depth value information of an object to be imaged. The electronic device 100 may obtain a coded image by receiving light through the TOF sensor, and may obtain a feature point based on the obtained coded image. That is, the disclosure is not limited to a type of the image sensor 1422 that receives light.

The light source 141 may output light. For example, the light source 141 may emit light toward the object. The light output by the light source 141 may be reflected from the object and may be transmitted through the pattern mask 1421.

A gaze tracking sensor or the TOF sensor of the disclosure generally uses an infrared (IR) light source. To track a gaze using the gaze tracking sensor, light in an infrared band output from the IR light source may be reflected from an eye and may be transmitted through the pattern mask 1421. The light reflected from the eye and transmitted through the pattern mask 1421 may be received by the gaze tracking sensor. To obtain depth information using the TOF sensor, light in an infrared band output from the infrared light source may be reflected from the object and may be transmitted through the pattern mask 1421. The light reflected from the object and transmitted through the pattern mask 1421 may be received by the TOF sensor. In this case, a plurality of separate IR light sources may be used as the light source 141 corresponding to the gaze tracking sensor and the TOF sensor.

The pattern mask 1421 may be a mask on which a pattern is formed. In the pattern mask 1421, a path of transmitted light may be changed according to the pattern. The pattern mask 1421 may have different patterns, and a plurality of areas constituting the pattern may have various thicknesses. A transmission amount and a path of light transmitted through the pattern mask 1421 may vary according to a pattern shape including a plurality of areas having various thicknesses, and an original image may be distorted according to the transmission amount and path of the light.

The pattern on the pattern mask 1421 will be described in detail with reference to FIGS. 7 to 9.

The image sensor 1422 is an imaging device configured to receive light transmitted through the pattern mask 1421, convert a luminance or an intensity of the received light into an electrical signal, and obtain a coded image by imaging the electrical signal. The image sensor 1422 may be, for example, but is not limited to, a charge-coupled device (CCD) or a complementary metal-oxide semiconductor (CMOS).

The processor 150 may execute one or more instructions or program code stored in the memory 160, and may perform a function and/or an operation corresponding to the instructions or the program code. The processor 150 may include a hardware component for performing arithmetic, logic, and input/output operations and signal processing. The processor 150 may include at least one of, for example, but not limited to, a central processing unit, a microprocessor, a graphics processing unit, an application processor (AP), an application-specific integrated circuit (ASIC), a digital signal processor (DSP), a digital signal processing device (DSPD), a programmable logic device (PLD), or a field-programmable gate array (FPGA).

Although the processor 150 is one element in FIG. 3, the disclosure is not limited thereto. In an embodiment of the disclosure, one or more processors 150 may be provided.

In an embodiment of the disclosure, the processor 150 may be a dedicated hardware chip for performing AI learning.

Instructions and program code readable by the processor 150 may be stored in the memory 160. The memory 160 may include at least one of, for example, a flash memory type, a hard disk type, a multimedia card micro type, a card-type memory (e.g., SD or XD memory), a random-access memory (RAM), a static random-access memory (SRAM), a read-only memory (ROM), an electrically erasable programmable read-only memory (EEPROM), a programmable read-only memory (PROM), a mask ROM, a flash ROM, a hard disk drive (HDD), or a solid-state drive (SSD).

Instructions or program code for performing functions or operations of the electronic device 100 may be stored in the memory 160. In an embodiment of the disclosure, at least one of instructions, an algorithm, a data structure, program code, or an application program readable by the processor 150 may be stored in the memory 160. The instructions, algorithm, data structure, and program code stored in the memory 160 may be implemented in a programming or scripting language such as C, C++, Java, or assembler.

Instructions, an algorithm, a data structure, or program code related to an AI model for extracting a feature point of a coded image may be stored in the memory 160. A 'module' included in the memory 160 may refer to a unit for processing a function or an operation performed by the processor 150, and may be implemented as software such as instructions, an algorithm, a data structure, or program code.

The processor 150 may be implemented by executing the instructions or program code stored in the memory 160.

The processor 150 may obtain a coded image that is phase-modulated, using light transmitted through the pattern mask 1421 and received through the image sensor 1422.

In an embodiment of the disclosure, the image sensor 1422 may include a TOF sensor for obtaining depth information by receiving light. The processor 150 may obtain a coded image using light transmitted through the pattern mask 1421 and received through the TOF sensor. The coded image obtained using the light received through the TOF sensor may include depth information corresponding to an object, and may be an image that is modulated by the pattern mask 1421.

In an embodiment of the disclosure, the image sensor 1422 may include a light sensor that obtains an image of a target object. The processor 150 may obtain a coded image, based on light transmitted through the pattern mask 1421 and received through the light sensor.

In an embodiment of the disclosure, the electronic device 100 may include the TOF sensor and the light sensor. The processor 150 may obtain a first coded image based on light received through the TOF sensor. The processor 150 may obtain a second coded image based on light received through the light sensor. The processor 150 may obtain a feature point, by selectively using at least one of the first coded image or the second coded image.

The processor 150 may include a plurality of processors. For example, the processor 150 may include a first processor and a second processor. In an embodiment of the disclosure, the first processor may obtain a feature point using the first coded image, and the second processor may obtain a feature point using the second coded image. In this case, a light source for obtaining the first coded image and a light source for obtaining the second coded image may be light sources having different wavelength bands. Also, as the light source for obtaining the first coded image and the light source for obtaining the second coded image, a light source including a light-emitting device including a plurality of LEDs that emit light in a plurality of wavelength bands may be used.

The processor 150 may obtain a feature point of an eye from the coded image. The processor may obtain a feature point using an AI algorithm trained to extract a feature point from a coded image that is phase-modulated by a pattern.

The feature point may include information about at least one of position coordinates or a shape of the eye. Alternatively, the feature point may include at least one of a pupil feature point or a glint feature point.

In an embodiment of the disclosure, the processor 150 may obtain only a feature point of the eye from the coded image. That is, the processor 150 may directly obtain a feature point from the coded image without reconstructing an original image.

The processor 150 may obtain gaze information of a user based on the feature point. That is, the processor 150 may determine a gaze direction of the user, by considering a shape of a pupil and glint coordinates.

In an embodiment of the disclosure, the processor 150 may reconstruct the original image of the eye from the coded image. The original image may refer to an image based on light before light is modulated by the pattern mask. The processor 150 may reconstruct the original image, using an AI algorithm trained to reconstruct the original image from the coded image. The original image may be an infrared image, obtained by receiving light output from the light source, reflected by the eye, and transmitted through the pattern mask.

The processor 150 may obtain authentication information of the user based on the original image. The processor 150 may perform user authentication based on the authentication information of the user. In detail, the processor 150 may identify iris information of the user based on the original image. The processor 150 may obtain the authentication information using the identified iris information.

In an embodiment of the disclosure, the processor 150 may obtain process determination information about a situation of the user. The processor 150 may selectively obtain the gaze information of the user or the authentication information, based on the process determination information. That is, the electronic device according to an embodiment of the disclosure may determine whether to track a gaze of the user and perform user authentication by considering a situation of the user, and may perform an operation according to the determination.

The 'coded image' in the disclosure may be an image with a distorted focus, obtained using light that is phase-modulated while being transmitted through the pattern mask 1421. The original image distorted according to a pattern, that is, the coded image 20, may not be recognized with naked eyes.

The processor of the electronic device according to an embodiment of the disclosure may use an AI model trained to extract a feature point of the original image. In an embodiment of the disclosure, the AI model may be a deep neural network model trained through supervised learning by applying a plurality of pre-obtained original images as input data and applying a plurality of feature points respectively corresponding to the plurality of original images as an output ground truth. The term 'training' may refer to training a neural network to discover or learn a method of analyzing input data for the neural network, a method of classifying the input data, and/or a method of extracting a feature required to generate result data from the input data. In detail, through a learning process, a deep neural network model may optimize weight values in a neural network by training on training data (e.g., a plurality of original images and a plurality of feature points). The deep neural network model outputs a desired result, by processing input data, through the neural network having the optimized weight values.

The disclosure is not limited to a type of an AI model, and an AI model may be implemented as any one of a convolutional neural network (CNN), a recurrent neural network (RNN), a restricted Boltzmann machine (RBM), a deep belief network (DBN), a bidirectional recurrent deep neural network (BRDNN), deep Q-network, etc. Also, an AI model may be sub-divided. For example, a convolutional neural network model may be sub-divided into a deep convolutional neural network (D-CNN) or a capsule neural network (Capsnet) (not shown).

The processor 150 may obtain a feature point from a coded image, using a pre-trained AI model. In an embodiment of the disclosure, the processor 150 may input a coded image obtained through the image sensor 1422 to an AI model, and may obtain a feature point corresponding to the coded image by performing inference using the AI model.

The AI model may be stored in the memory 160 of the electronic device 100. However, this is merely an example, and the disclosure is not limited thereto. For example, the AI model may be stored in an external server. In this case, the electronic device 100 may further include a communication interface that may perform data communication with the external server, and may receive the AI model or inference result data (e.g., feature point) by the AI model from the external server through the communication interface. In general, the electronic device 100 may have a limited memory storage capacity, computational processing speed, and training data set collection capability, compared to a server. Accordingly, an operation that requires a large data storage and a large calculation amount may be performed by the server, and then required data and/or an AI model may be transmitted to the electronic device 100 through the communication network. In this case, because the electronic device 100 may rapidly and easily perform a required operation without a large-capacity memory and a high-speed processor by receiving and using the AI model or inference data by the AI model from the server.

Figure 4:
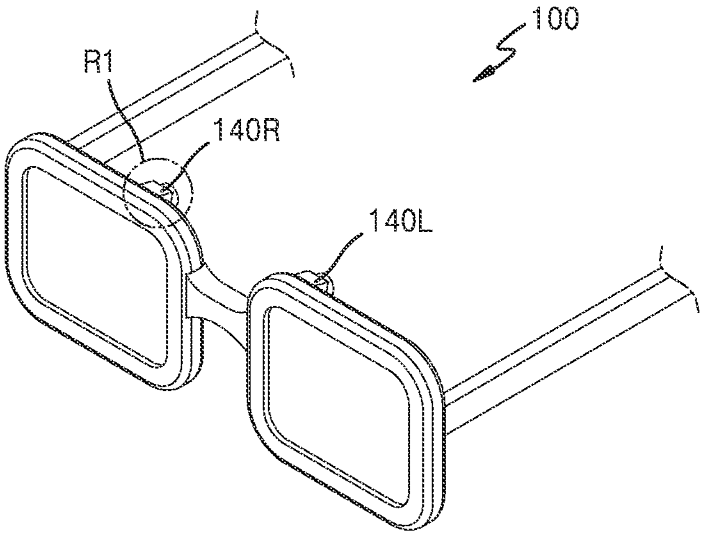
FIG. 4 is a diagram illustrating a structure of an electronic device, according to an embodiment of the disclosure.

FIG. 4 is a diagram illustrating a structure of an electronic device, according to an embodiment of the disclosure.

Referring to FIG. 4, a user may see a real object while wearing the electronic device 100. The electronic device 100 may include a gaze tracking sensor 140. However, only essential elements for describing an operation of the electronic device 100 are illustrated in FIG. 4, and elements included in the electronic device 100 are not limited to those illustrated in FIG. 4.

In the disclosure, the gaze tracking sensor 140 may refer to an element including the light detector 142 of FIG. 3, that is, the pattern mask 1421 and the image sensor 1422.

Also, although the electronic device 100 is AR glasses that the user wears on his/her face, examples of the electronic device 100 may include an HMD apparatus that is mounted on a head, an AR helmet, etc.

In an embodiment of the disclosure, the electronic device 100 may detect a feature point by receiving reflected light that is reflected by the user's eye using the gaze tracking sensor 140, and may determine a gaze direction of the user based on the feature point. In an embodiment of the disclosure, the electronic device 100 may detect a feature point by receiving reflected light that is reflected by the user's eye using the gaze tracking sensor 140, and may perform user authentication based on the feature point.

Figure 5:
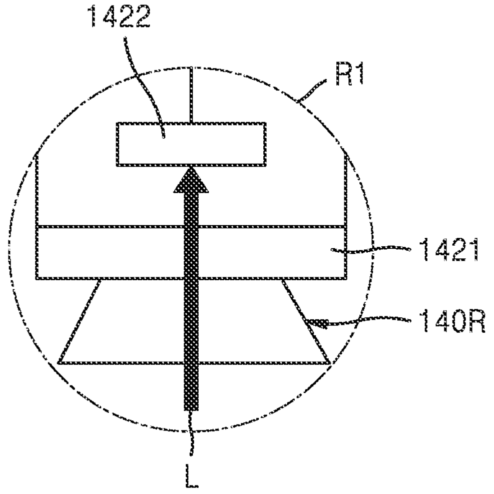
FIG. 5 is a diagram illustrating a structure of a light detector of an electronic device, according to an embodiment of the disclosure.

FIG. 5 is a diagram illustrating a structure of a light detector of an electronic device, according to an embodiment of the disclosure. For reference, FIG. 5 is an enlarged view illustrating the inside of the gaze tracking sensor 140, by enlarging a portion R1 of FIG. 4.

For convenience of explanation, the same description as that made with reference to FIGS. 1 to 4 will be briefly provided or omitted.

Referring to FIG. 5, the gaze tracking sensor 140 (shown as 140R but the same applies to 140L) according to an embodiment of the disclosure may include the light detector 142, that is, the pattern mask 1421 and the image sensor 1422.

In an embodiment of the disclosure, the light detector 142 may receive light L output from the light source 141 and reflected from an object. The light L reflected from the object may be transmitted through a pattern mask. The light L reflected from the object may be phase-modulated while being transmitted through the pattern mask. The light L that is phase-modulated may be received by the image sensor 1422.

When the light is received by the image sensor 1422, the electronic device 100 may obtain a coded image. The electronic device 100 may obtain a feature point from the coded image, or may reconstruct an original image.

Also, related art gaze tracking camera systems using various combinations of lenses may have issues in reducing a size because of thicknesses of a plurality of lenses. Because the gaze tracking sensor 140 using the electronic device 100 according to an embodiment of the disclosure replaces lenses with the thin pattern mask 1421, a size may be reduced (a small form factor may be achieved). For example, a camera module using the electronic device 100 of the disclosure may be inserted into a frame of AR glasses, and a protrusion of the frame that may occur as the camera module is inserted may be minimized.

Figure 6:
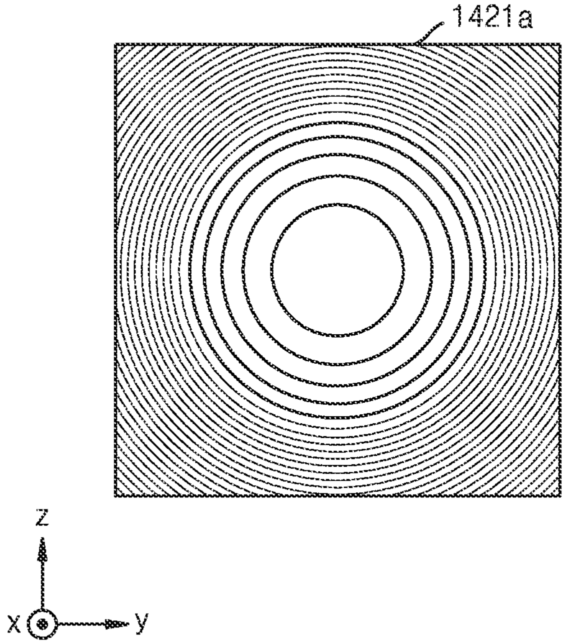
FIG. 6 is a diagram illustrating a pattern mask of an electronic device, according to an embodiment of the disclosure.

FIG. 6 is a diagram illustrating a pattern mask of an electronic device, according to an embodiment of the disclosure. FIG. 7 is a diagram illustrating a pattern mask of an electronic device, according to an embodiment of the disclosure. FIG. 8 is a diagram illustrating an operation in which an electronic device obtains a coded image using a pattern mask, according to an embodiment of the disclosure.

Figure 7:
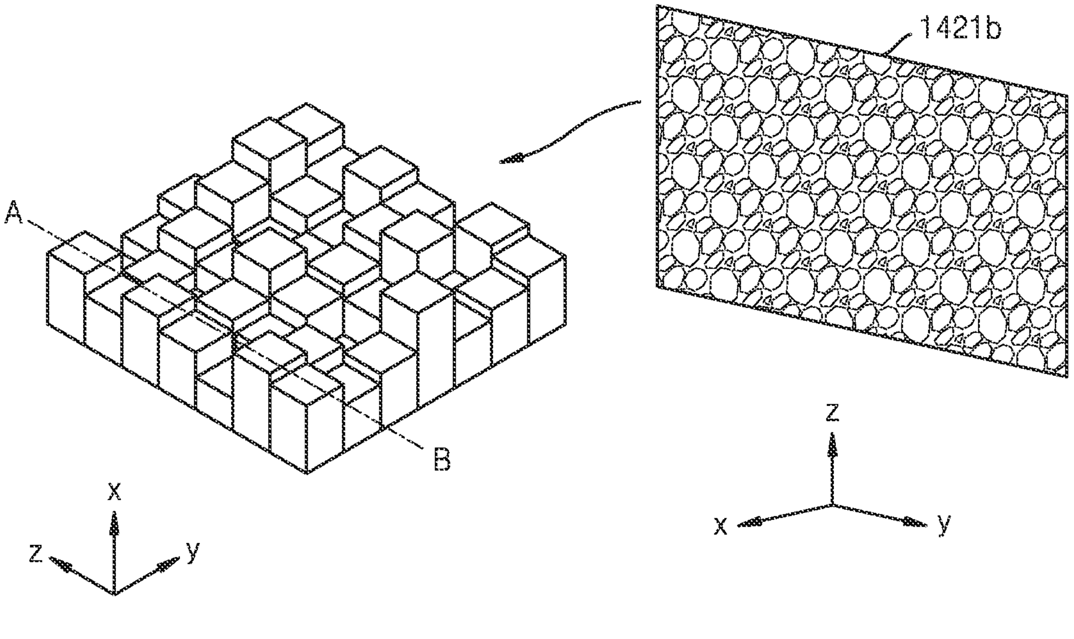
FIG. 7 is a diagram illustrating a pattern mask of an electronic device, according to an embodiment of the disclosure.
Figure 8:
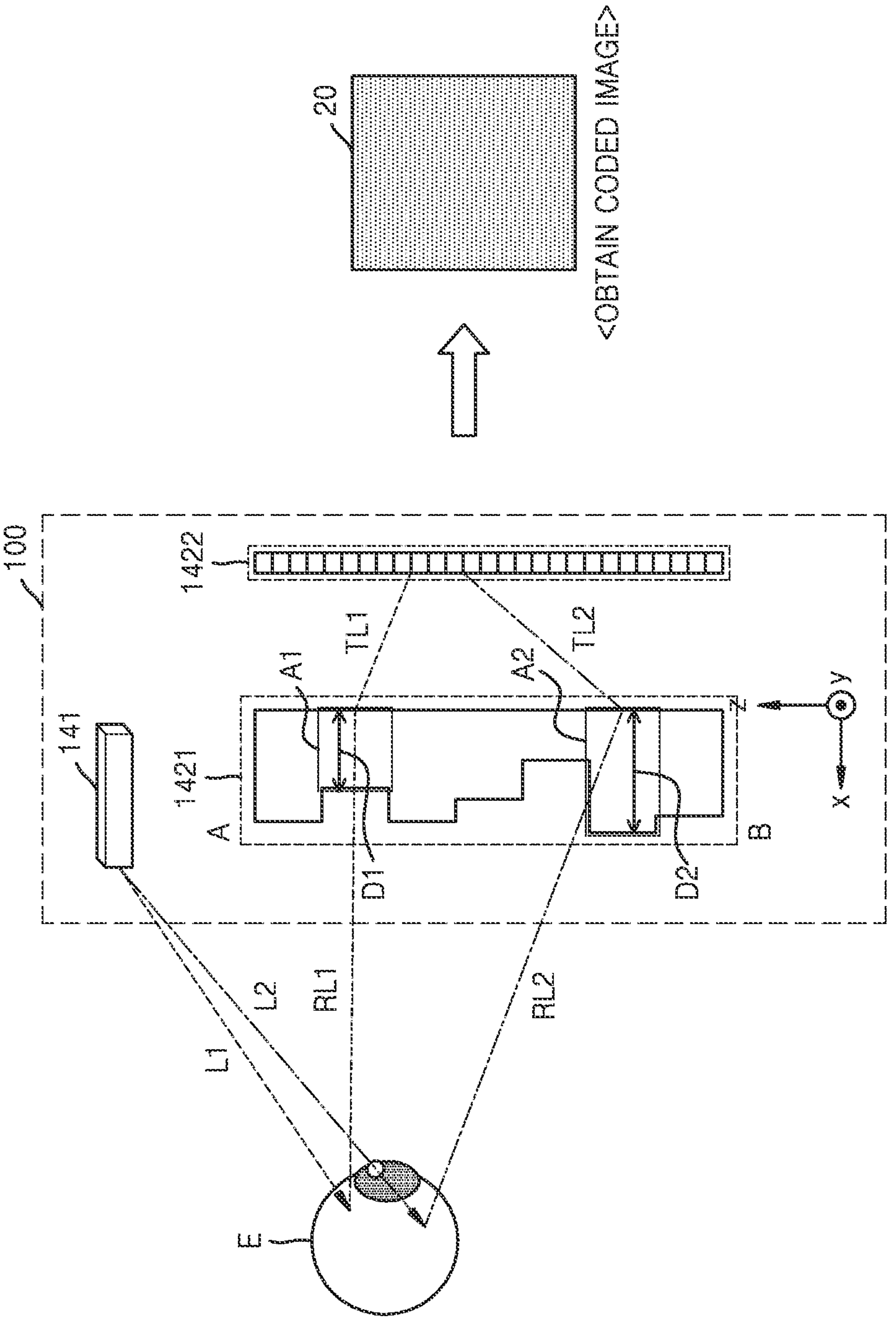
FIG. 8 is a diagram illustrating an operation in which an electronic device obtains a coded image using a pattern mask, according to an embodiment of the disclosure.

In an embodiment of the disclosure, the pattern mask 1421 of FIG. 8 corresponds to a cross-section of a pattern mask 1421*b* of FIG. 7 taken along line A-B.

Referring to FIGS. 6 and 7, pattern masks 1421*a* and 1421*b* according to an embodiment of the disclosure are illustrated. As shown in FIG. 6, the pattern mask 1421*a* may have, for example, a circular pattern. The pattern mask 1421*a* may have a pattern in which a shape is regularly repeated. That is, the pattern mask 1421 may have a concentric pattern in which circular shapes having different radii are repeated.

However, a shape of a pattern of the pattern mask of FIGS. 6 and 7 is merely an example, and the disclosure is not limited thereto.

For example, the pattern mask 1421*a* may have a quadrangular pattern. The pattern mask 1421*a* may have a pattern in which a quadrangular shape is repeated. In another example, as shown in FIG. 7, the pattern mask 1421*b* may have an irregular pattern.

Referring to FIG. 8, in an embodiment of the disclosure, the electronic device 100 may obtain the coded image 20 that is phase-modulated, by receiving light transmitted through the pattern mask 1421 and received through the image sensor 1422.

The pattern mask 1421 through which light is transmitted may include a first area A1 having a first thickness D1 and a second area A2 having a second thickness D2. A degree of refraction of light transmitted through the pattern mask 1421 may vary according to a thickness of an area through which the light is transmitted. Accordingly, the electronic device 100 may obtain the coded image 20.

The light source 141 may output first light L1 and second light L2. The first light L1 and the second light L2 may be emitted to an object. Although the object is a user's eye E, this is merely an example, and the disclosure is not limited thereto. For example, the object may be a laptop computer PC (see FIG. 9), a hand H (see FIG. 10), a fan, or a mobile phone.

First, referring to the first light L1, the first light L1 may reach the object, that is, the eye E. The first light L1 reaching the object may be reflected from a surface of the object. First reflected light RL1 reflected from the surface of the object may travel toward the pattern mask 1421.

The first reflected light RL1 may be transmitted through the pattern mask 1421. The first reflected light RL1 may be transmitted through the first area A1 of the pattern mask 1421. The first area A1 may be a pattern area of the pattern mask 1421 having the first thickness D1. The first reflected light RL1 may be reflected by being transmitted through the first area A1 of the first thickness D1. The first thickness D1 may be less than the second thickness D2 described below. Accordingly, the first reflected light RL1 may be refracted less and may reach the image sensor 1422. The image sensor 1422 may receive first transmitted light TL1 transmitted through the first area A1.

Referring to the second light L2, the second light L2 may reach the object. The second light L2 reaching the object may be reflected from a surface of the object. Second reflected light RL2 reflected from the surface of the object may travel toward the pattern mask 1421.

The second reflected light RL2 may be transmitted through the pattern mask 1421. The second reflected light RL2 may be transmitted through the second area A2 of the pattern mask 1421. The second area A2 may be a pattern area of the pattern mask 1421 having the second thickness D2. The second reflected light RL2 may be refracted by being transmitted through the second area A2 of the second thickness D2. The second thickness D2 may be greater than the first thickness D1. Accordingly, the second reflected light RL2 may be refracted more and may reach the image sensor 1422. The image sensor 1422 may receive second transmitted light TL2 transmitted through the second area A2.

The image sensor 1422 may obtain the coded image 20 that is phase-modulated, by receiving light output from the light source 141 and transmitted through the pattern mask 1421. The light transmitted through the pattern mask 1421 may include reflected light output from the light source 141 and reflected from the user's eye. The image sensor 1422 may obtain the coded image 20, by receiving the first transmitted light TL1 and the second transmitted light TL2. Because the first transmitted light TL1 and the second transmitted light TL21 have different degrees of refraction by being respectively transmitted through the first area A1 and the second area A2 of the pattern mask 1421, the coded image 20 may include information about an object that may not be recognized with naked eyes.

In FIG. 8, although the pattern mask 1421 has a pattern in which the first area A1 having the first thickness D1 and the second area A2 having the second thickness D2 are irregularly arranged based on the pattern mask 1421*b* of FIG. 7, a pattern shape of the pattern mask 1421 is merely an example, and the disclosure is not limited thereto. For example, the pattern mask 1421 may have a cross-sectional pattern in which the first area A1 and the second area A2 are regularly repeated. In an embodiment of the disclosure, the pattern mask 1421 may have a cross-sectional pattern including a first area having a first thickness, a second area having a second thickness, and a third area having a third thickness.

Figure 9:
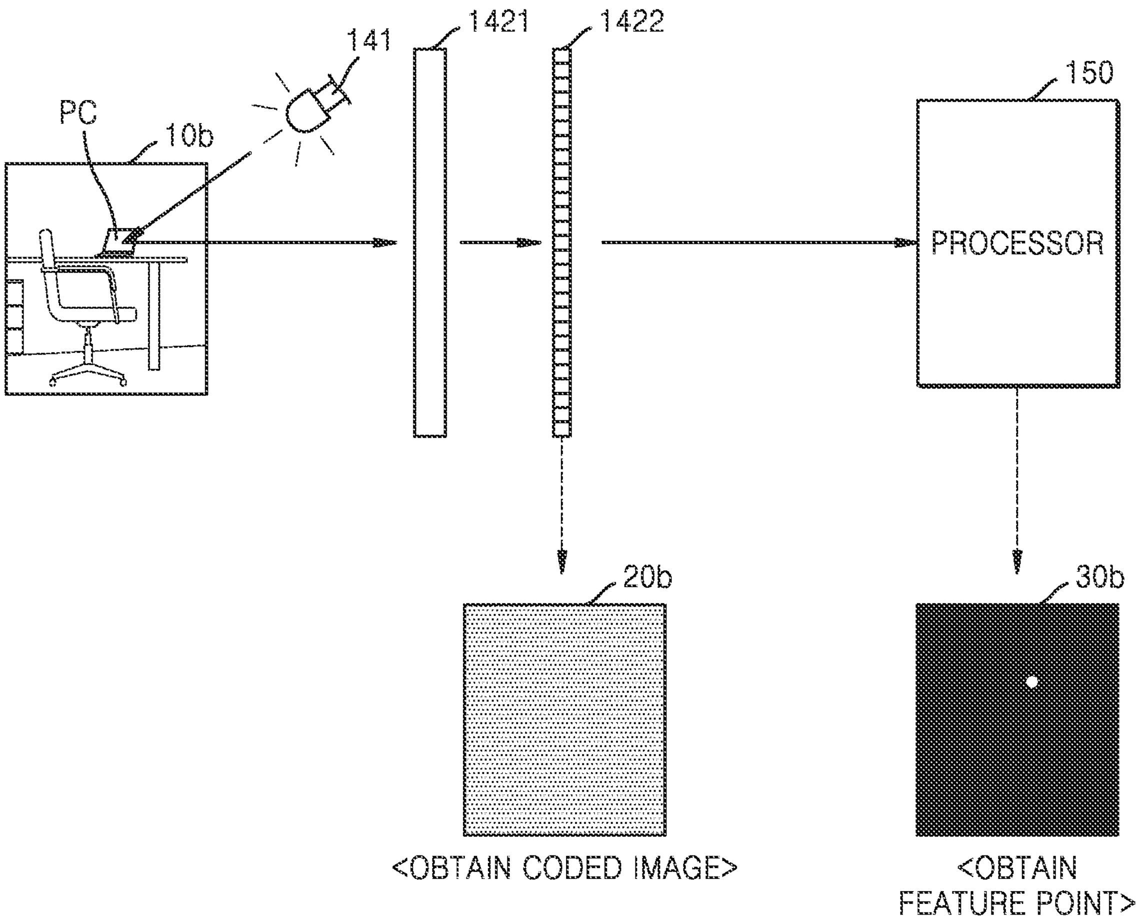
FIG. 9 is a diagram illustrating an operation in which an electronic device recognizes an object through various types of feature points extracted from a coded image, according to an embodiment of the disclosure.
Figure 10:
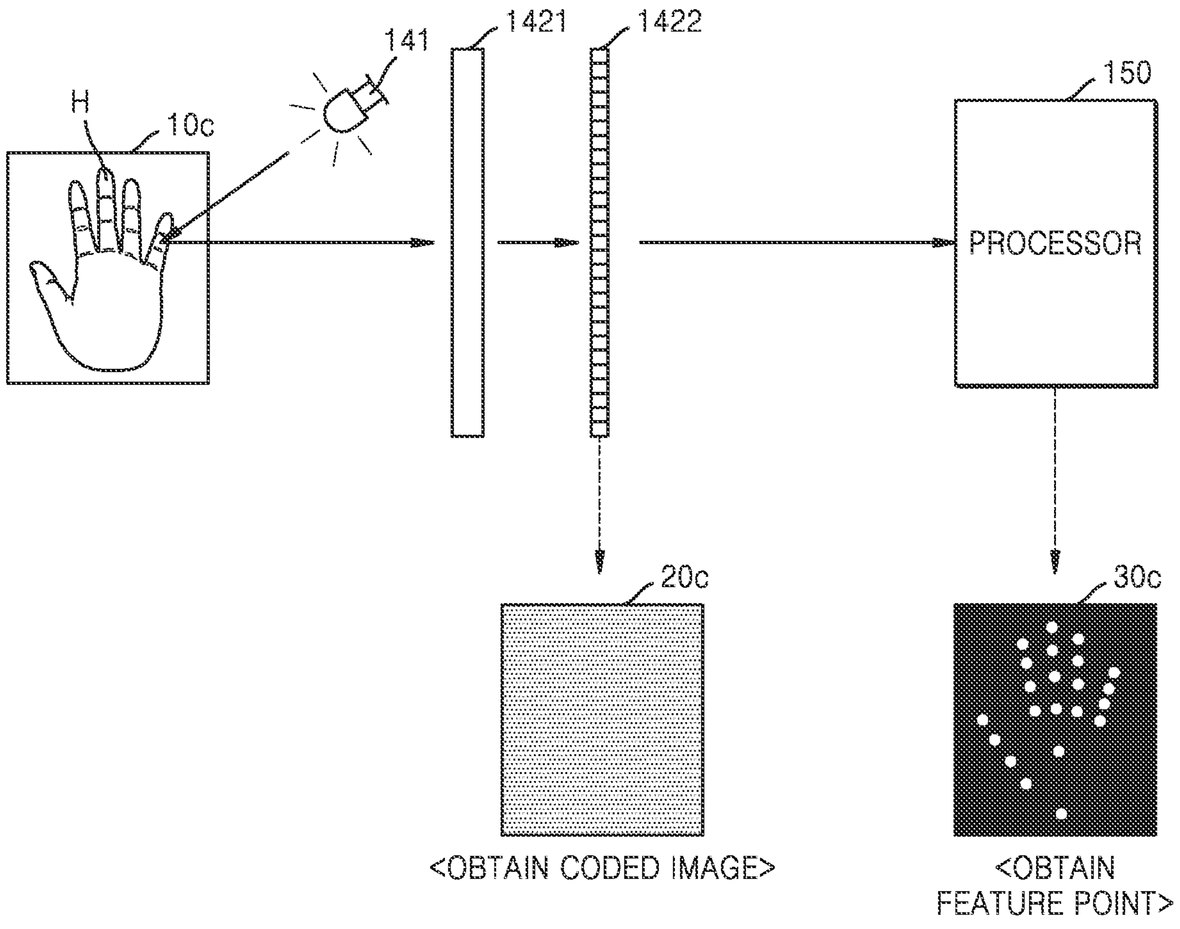
FIG. 10 is a diagram illustrating an operation in which an electronic device recognizes an object through various types of feature points extracted from a coded image, according to an embodiment of the disclosure.

FIG. 9 is a diagram illustrating an operation in which an electronic device recognizes an object through various types of feature points extracted from a coded image, according to an embodiment of the disclosure. FIG. 10 is a diagram illustrating an operation in which an electronic device recognizes an object through various types of feature points extracted from a coded image, according to an embodiment of the disclosure.

For convenience of explanation, the same description as that made with reference to FIGS. 1 to 8 will be briefly provided or omitted.

Referring to FIG. 9, the electronic device 100 may obtain an original image 10*b*. The original image 10*b* may include an object, and the object may be a target object to be recognized by the electronic device 100. As shown in FIG. 9, the original image 10*b* may include a laptop computer PC.

Although the object is the laptop computer PC in FIG. 9, this is merely an example, and the disclosure is not limited thereto. For example, the object may be any object to be recognized by the electronic device 100 such as a laptop computer, a mobile phone, or a coffee. In another example, as shown in FIG. 10, the object may be a user's hand H (see FIG. 10).

The electronic device 100 may obtain a coded image 20*b*. The coded image 20*b* may be an image coded while being transmitted through the pattern mask 1421. The electronic device 100 may obtain the coded image 20*b* by receiving light output from the light source 141, reflected by the object, that is, the laptop computer PC, and transmitted through the pattern mask, through the image sensor 1422.

The electronic device 100 may obtain a feature point 30*b*. The feature point 30*b* may correspond to the object to be recognized by the electronic device 100 in the original image 10*b*. The feature point 30*b* may be data that may be represented as point coordinates as described with reference to FIG. 1, or data on parameters indicating a shape and form.

However, a method of representing a feature point is merely an example, and the disclosure is not limited thereto. For example, although the feature point 30*b* includes a position coordinate value as data, the feature point may be represented as a point or text.

In another example, a shape of the laptop computer may include a quadrangular shape. Accordingly, to represent a shape of the laptop computer, the feature point 30*b* may include numerical values corresponding to parameters related to a quadrangular shape. To correspond a laptop computer having a diamond shape to a feature point, the feature point 30*b* may include at least one of coordinates of the center of the diamond shape, a length of a long side, a length of a short side, or a small internal angle among internal angles. In this case, the feature point 30*b* corresponding to the laptop computer may be data stored in the same manner as that of the pupil feature point 32 described with reference to FIG. 1.

In an embodiment of the disclosure, the image sensor 1422 may include a TOF sensor. The electronic device may obtain a coded image using light received through the TOF sensor. The coded image obtained using the light received through the TOF sensor may include depth information corresponding to the object, and may be an image modulated by the pattern mask 1421.

In an embodiment of the disclosure, the processor 150 may obtain a depth map including depth information to the object, based on the coded image obtained using the TOF sensor. The processor may obtain a depth map, using an AI algorithm trained to extract a depth map from the coded image that is phase-modulated by a pattern.

In an embodiment of the disclosure, the image sensor may include a TOF sensor that depth information and a light sensor that obtains an image of a target object. The processor 150 may select one of a first coded image based on light received by the light sensor and a second coded image based on light received by the TOF sensor.

The processor 150 may obtain a feature point or depth information, by selectively using at least one of the first coded image or the second coded image. Also, the processor 150 may obtain an original image or depth information, by selectively using at least one of the first coded image or the second coded image.

When the processor includes a plurality of processors, a first processor may obtain an original image using the first coded image, and a second processor may obtain depth information using the second coded image. Alternatively, the first processor may obtain a feature point using the first coded image, and the second processor may obtain depth information using the second coded image. For reference, an operation in which the processor 150 obtains an original image will be described below with reference to FIG. 11.

For convenience of explanation, the same description as that made with reference to FIG. 9 will be briefly provided or omitted. Referring to FIG. 10, the electronic device may obtain an original image 10*c*. The original image 10*c* may include an object, and the object may be a hand H of a user.

The electronic device may obtain a coded image 20*c*. The electronic device may obtain the coded image 20*c*, by receiving light whose path is changed while being transmitted through the patter mask 1421.

The electronic device may obtain one or more feature points 30*c*. The one or more feature points 30*c* may be data corresponding to an object to be recognized by the electronic device. As shown in FIG. 10, the one or more feature points 30*c* corresponding to the object, that is, the hand H of the user, may be represented as points, and thus, may be position coordinate values. The one or more feature points 30*c* corresponding to the hand of the user may be data stored in the same manner as that of the glint feature point 31 described with reference to FIG. 1.

In an embodiment of the disclosure, in the case of the hand of the user, the one or more feature points 30*c* may correspond to one or more joints included in the hand. In an embodiment of the disclosure, the electronic device may obtain joint values that are three-dimensional (3D) position coordinate values that are position information about x, y, and z axes of one or more joints included in the hand according to a recognition result of the hand, based on the coded image 20*c*. The one or more feature points 30*c* may be data including respective joint values.

For reference, a 3D pose of the hand may be recognized through a "hand skeleton detection and tracking" technique. The hand skeleton detection and tracking technique is a technique of detecting moving joints in a hand image of a person and dividing and projecting a pre-determined skeleton structure. The skeleton structure of the hand of the person may include, but is not limited to, five ends of fingers, that is, (5*3=15) joint points of the fingers, one palm point, and one wrist point.

In an embodiment of the disclosure, the one or more feature points 30*c* may be data including joint values corresponding to the skeleton structure of the hand of the person recognized using the hand skeleton detection and tracking technique. However, a method of representing a feature point is merely an example, and the disclosure is not limited thereto. For example, the feature point 30*c* corresponding to the hand of the user may not be represented as one or more points, but may be represented as one point representing a position of the hand of the person. In detail, the feature point 30*c* may be a position coordinate value of a point that is the center of the hand of the user.

In another example, a shape of the hand of the user may be represented as an elliptical shape including an outline of the hand. In this case, to represent the hand of the user, the feature point 30*c* may include a numerical value corresponding to a parameter related to the elliptical shape. The feature point 30*c* stored as the parameter related to the elliptical shape may be data stored in the same manner as the pupil feature point 32 described with reference to FIG. 1.

In an embodiment of the disclosure, the image sensor 1422 for obtaining the feature point 30*c* including joint values corresponding to the skeleton structure of the hand may include a TOF sensor. In an embodiment of the disclosure, the processor 150 may obtain depth information to a target object, based on a coded image obtained using the TOF sensor. This has been described with reference to FIG. 9, and thus, a repeated description will be omitted. In this case, the target object may be the hand, and the processor 150 may obtain depth information of parts of the hand including fingers, a palm, and a back of the hand including joints corresponding to the skeleton structure of the hand. The processor 150 may recognize a 3D pose or motion of the hand by obtaining 3D position information of the feature point 30*c* of each joint of the finger based on the obtained depth information.

Figure 11:
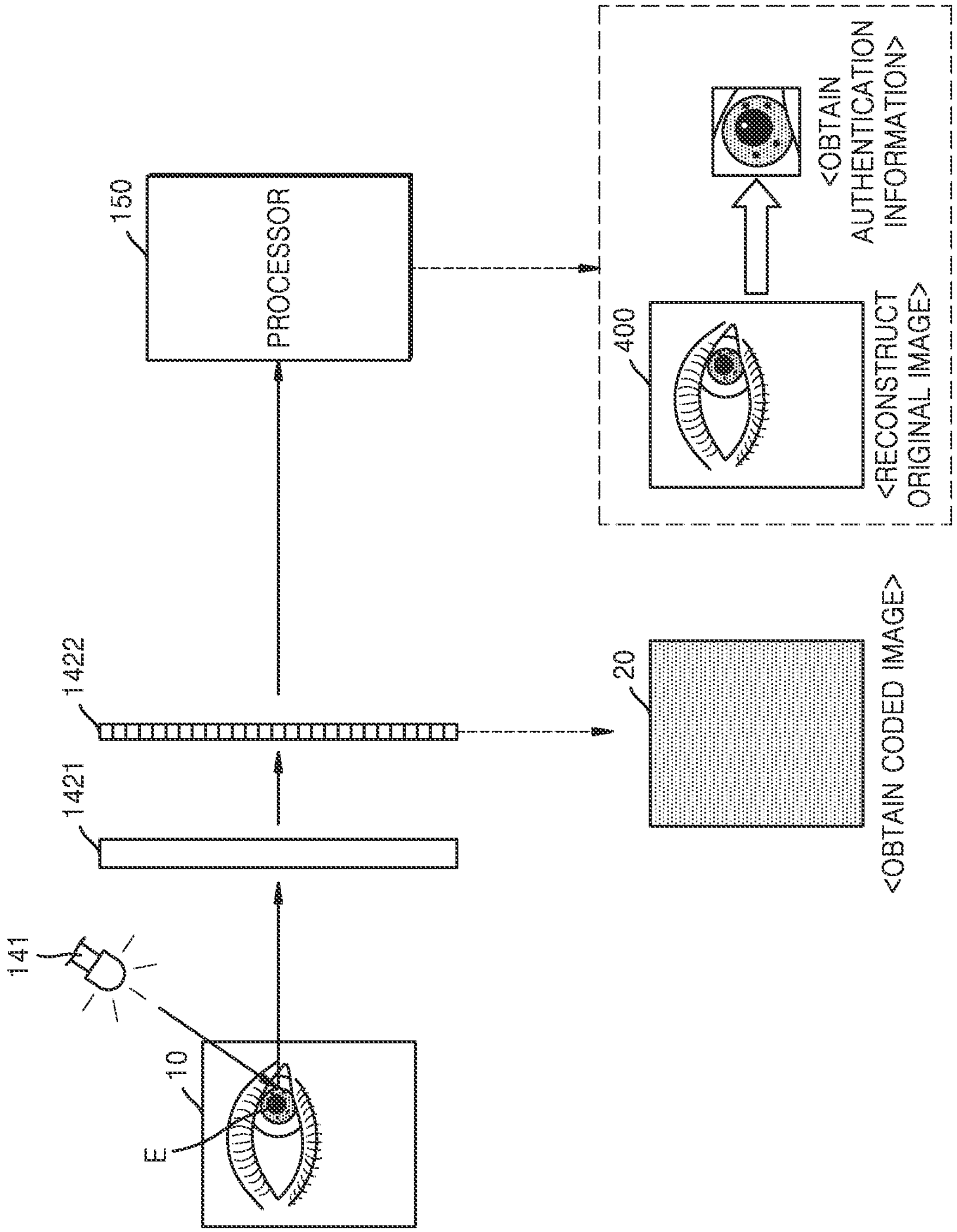
FIG. 11 is a diagram illustrating an operation in which an electronic device obtains a coded image using a pattern mask and reconstructs an original image from the obtained coded image, according to an embodiment of the disclosure.

FIG. 11 is a diagram illustrating an operation in which an electronic device obtains a coded image using a pattern mask and reconstructs an original image from the obtained coded image, according to an embodiment of the disclosure.

For convenience of explanation, the same description as that made with reference to FIG. 1 will be briefly provided or omitted.

In an embodiment of the disclosure, the electronic device may obtain the coded image 20 that is phase-modulated, by receiving light transmitted through the pattern mask 1421 through the image sensor 1422. The coded image 20 may be an image modulated as light reflected from an object included in the object image 10 is transmitted through the pattern mask 1421.

The electronic device may reconstruct an original image 400 from the coded image 20, using the processor 150. The processor 150 may include an AI algorithm or an AI network for reconstructing the original image 400. The AI algorithm included in the processor 150 may be an algorithm trained to reconstruct the original image 400 from a modulated image (i.e., the coded image 20).

The processor 150 may obtain the coded image 20 processed by the image sensor 1422. The processor 150 may obtain the original image 400 reconstructed from the coded image 20. The processor 150 may obtain authentication information of a user based on the reconstructed original image 400. The processor 150 may perform user authentication.

Figure 12:
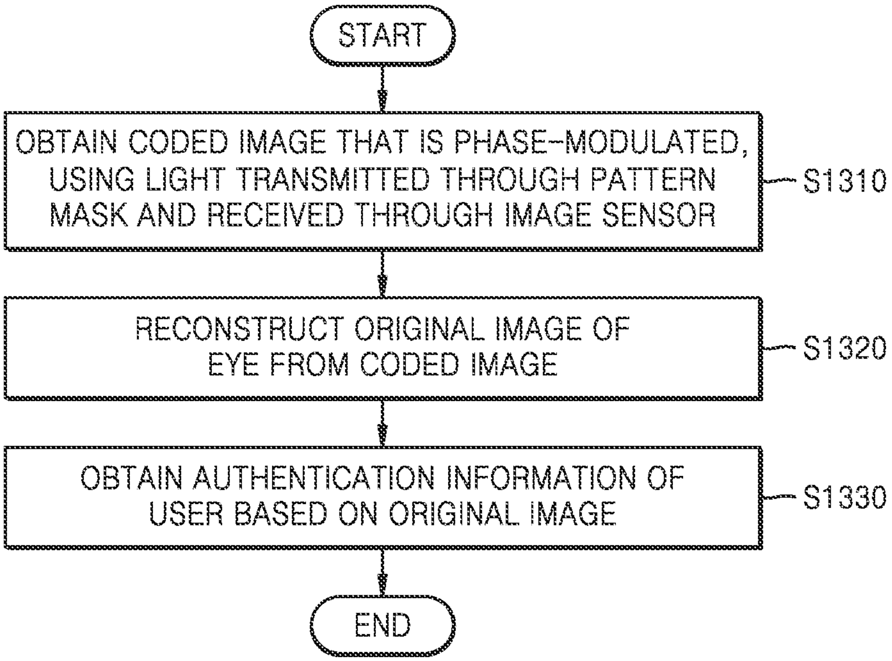
FIG. 12 is a flowchart illustrating an operating method of an electronic device, according to an embodiment of the disclosure.

FIG. 12 is a flowchart illustrating an operating method of an electronic device, according to an embodiment of the disclosure.

In operation S1310, an electronic device may obtain a coded image that is phase-modulated, using light transmitted through a pattern mask and received through an image sensor. The description of operation S1310 may be the same as that of operation S210, and thus, will be omitted.

In operation S1320, the electronic device may reconstruct an original image of an eye from the coded image.

The electronic device may receive light transmitted through the pattern mask using the image sensor. The received light may be light reflected from an object (e.g., eye) included in an object image. The received light may be modulated while being transmitted through the pattern mask. The image sensor may obtain a coded image using the received light.

The electronic device may reconstruct an original image of the object (e.g., eye) from the coded image, using the processor. The processor may reconstruct the original image from the coded image, using an AI algorithm for reconstructing the original image.

In operation S1330, the electronic device may obtain authentication information of a user based on the original image. The original image may include an image of an iris in the eye of the user.

Figure 13:
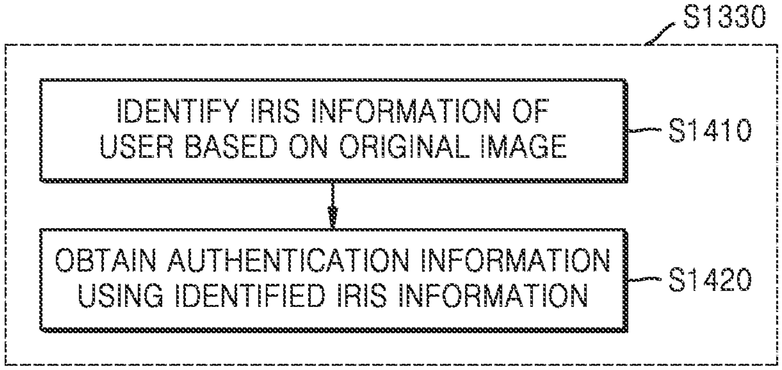
FIG. 13 is a flowchart illustrating an operating method of an electronic device, according to an embodiment of the disclosure.

FIG. 13 is a flowchart illustrating an operating method of an electronic device, according to an embodiment of the disclosure.

Further referring to FIG. 13, in operation S1410, the electronic device may identify iris information of the user based on the original image. The iris information may refer to information for distinguishing the user's iris from another user's iris.

In an embodiment of the disclosure, the electronic device may extract an iris area from the original image. The electronic device may identify the iris information of the user, by encrypting an image of the iris area. The electronic device may store the identified iris information of the user in a memory. The memory of the electronic device may store pieces of iris information of various users.

In an embodiment of the disclosure, the electronic device may remove objects other than the iris from the extracted iris area. For example, the electronic device may remove an eyelid detected in the iris area, from the original image. Accordingly, the electronic device may identify a clearer iris area. The electronic device may identify iris information of the user based on the extracted iris area.

In operation S1420, the electronic device may obtain authentication information using the identified iris information. The authentication information may include information about a result of identifying the user, using the iris information. For example, although the iris information may include information about an iris pattern unique to each person, the disclosure is not limited to a method of iris recognition. The authentication information may include information about whether the identified user is a user who may access the electronic device.

In an embodiment of the disclosure, the electronic device may obtain pieces of iris information of various users stored in the memory. The electronic device may compare the pieces of iris information of the various users stored in the memory with the obtained iris information of the user. Through the comparison, the electronic device may determine whether the identified user is a user who may access the electronic device.

For example, the electronic device may store iris information of a user who may access the electronic device in the memory. When it is determined that the iris information of the user who may access the electronic device stored in the memory is the same as the iris information of the newly identified user, the electronic device may determine that the newly identified user is a user who may access the electronic device.

In another example, when it is determined that the iris information of the user who may access the electronic device stored in the memory is different from the iris information of the newly identified user, the electronic device may determine that the newly identified user is a user who may not access the electronic device.

Figure 14:
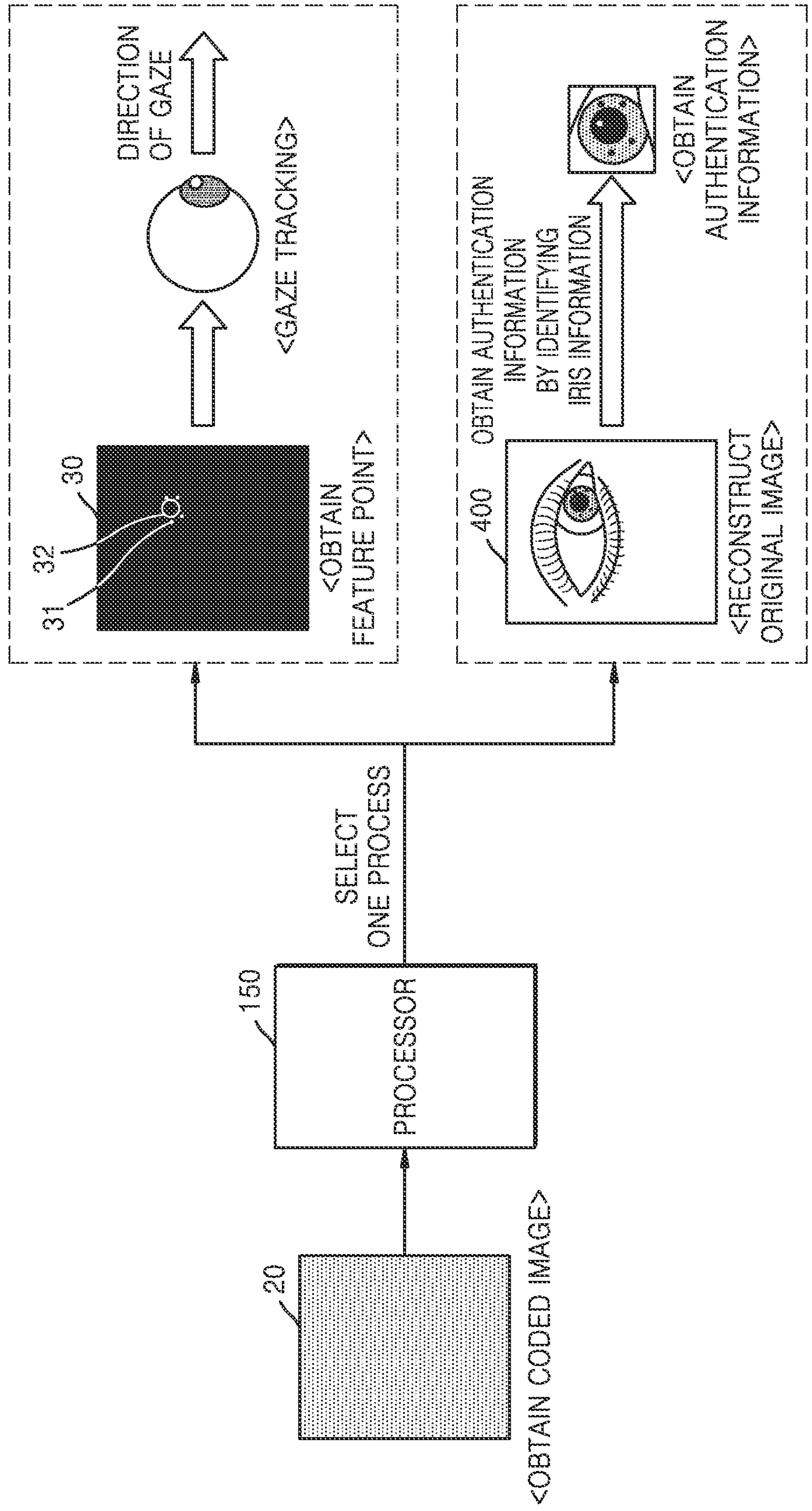
FIG. 14 is a diagram illustrating a method by which an electronic device selectively performs an operation of extracting a feature point from an obtained coded image or reconstructing an original image, according to an embodiment of the disclosure.

FIG. 14 is a diagram illustrating a method by which an electronic device selectively performs an operation of extracting a feature point from an obtained coded image or reconstructing an original image, according to an embodiment of the disclosure.

For convenience of explanation, the same description as that made with reference to FIGS. 1 and 11 will be briefly provided or omitted. For reference, the description of an operation in which the processor 150 extracts the feature point 30 using the coded image 20 is the same as that made with reference to FIG. 1, and the description of an operation in which the processor 150 reconstructs the original image 400 using the coded image 200 is the same as that made with reference to FIG. 12.

Referring to FIG. 14, the processor 150 may extract the feature point 30 using the coded image 20, or may reconstruct the original image 400.

In an embodiment of the disclosure, the processor 150 may obtain process determination information based on a situation of a user. The process determination information may be obtained according to the situation of the user.

For example, in a situation where the user wears the electronic device, the electronic device needs to perform user authentication. In this case, the electronic device may obtain process determination information to perform user authentication.

In another example, in a situation where the user continues to wear the electronic device, the electronic device needs to track a gaze of the user. In this case, the electronic device may obtain process determination information indicating that gaze tracking should be performed.

In an embodiment of the disclosure, the processor 150 may selectively obtain gaze information or authentication information of the user, based on the process determination information.

In an embodiment of the disclosure, in a situation where gaze tracking should be performed according to the process determination information, the processor 150 may select to obtain the gaze information of the user. In this case, the processor 150 may obtain the feature point 30, using the coded image 20. The processor 150 may track a gaze of the user based on the feature point 30.

In an embodiment of the disclosure, in a situation where user authentication should be performed according to the process determination information, the processor 150 may select to obtain the authentication information. In this case, the processor 150 may reconstruct the original image 400, using the coded image 20. The processor 150 may perform user authentication based on the original image 400.

In an embodiment of the disclosure, when the processor 150 includes a plurality of processors, a first processor may be configured to obtain a feature point using the coded image and a second processor may be configured to reconstruct an original image.

Figure 15:
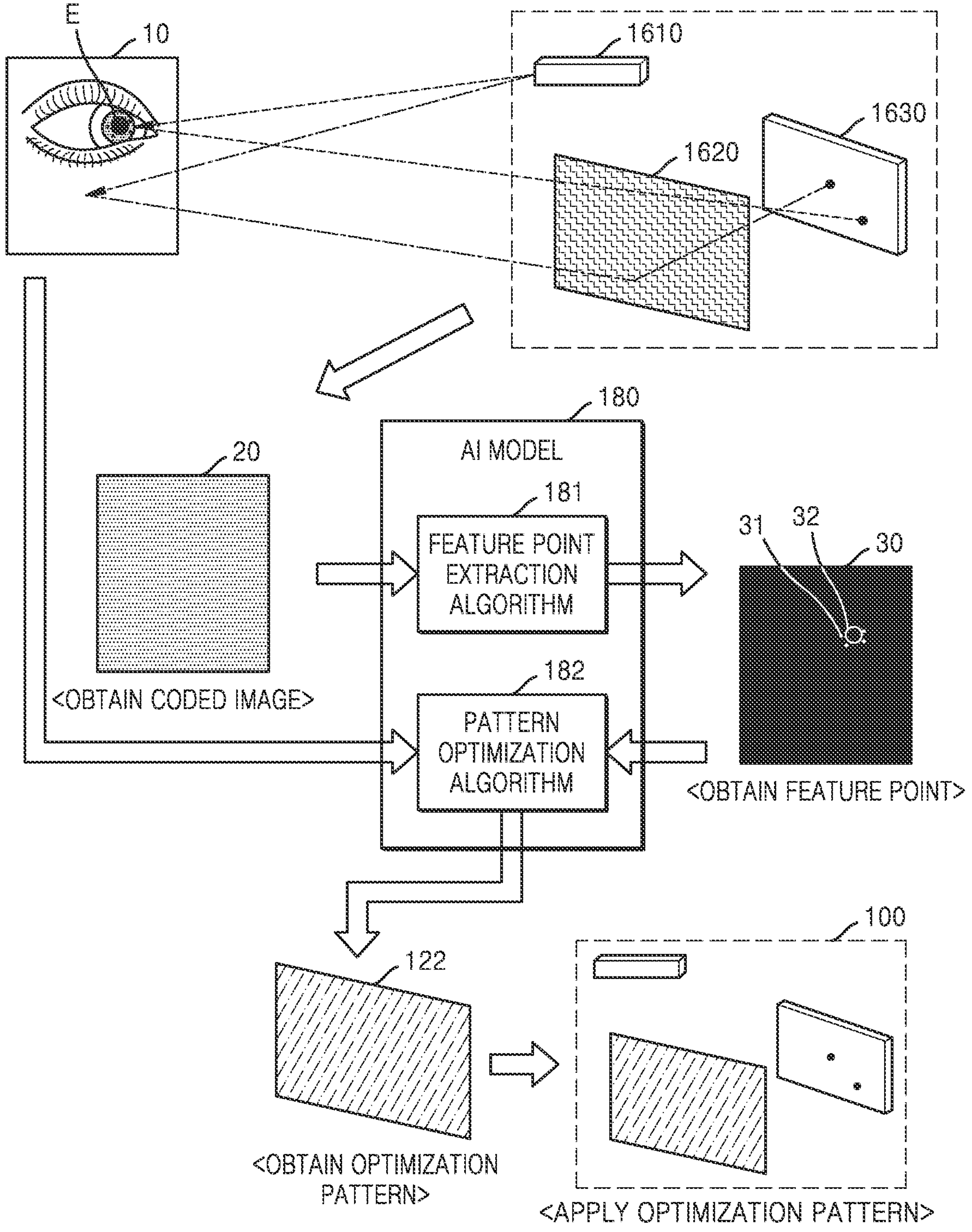
FIG. 15 is a diagram illustrating a method by which an artificial intelligence (AI) model is trained to extract a feature point and optimize a pattern based on the feature point, according to an embodiment of the disclosure.

FIG. 15 is a diagram illustrating a method by which an AI model is trained to extract a feature point and optimize a pattern based on the feature point, according to an embodiment of the disclosure.

For reference, unlike in FIGS. 1 to 14, a light source 1610, a pattern mask 1620, and an image sensor 1630 in FIG. 15 may be virtual elements that perform their functions to train an AI model 180.

Referring to FIG. 15, the coded image 20 that is phase-modulated may be obtained by receiving light transmitted through the pattern mask 1620 through the image sensor 1630.

The AI model 180 may be a model trained by performing, through virtual simulation, a process in which light output from the light source 1610 is reflected from an object, transmitted through the pattern mask 1620, and received through the image sensor 1630.

The virtual simulation performed by the AI model 180 may use, for example, ray tracing. That is, the AI model 180 may obtain the coded image 20, by receiving virtual light through the image sensor 1630, using a method of tracing a path of light. However, a method of simulating a path of light is merely an example, and the disclosure is not limited thereto.

The coded image 20 may be obtained based on light received by the image sensor 1630, using the virtual simulation. The coded image 20 that is phase-modulated may be obtained, by receiving light transmitted through the pattern mask 1620 through the image sensor 1630. A process of obtaining the coded image 20 is the same as that described with reference to FIG. 8, and thus, will be briefly described.

In an embodiment of the disclosure, the AI model 180 may be a model trained by performing a feature point extraction algorithm 181 and a pattern optimization algorithm 182.

The feature point extraction algorithm 181 may be an algorithm trained to extract a feature point from a modulated image. The AI model 180 may extract the feature point 30 from the coded image 20, using the feature point extraction algorithm 181.

For example, a difference between the extracted feature point 30 and a ground truth based on the object image 10 may be obtained, using the feature point extraction algorithm 181. The AI model 180 may be trained to extract a more accurate feature point from the coded image 20, based on the difference between the feature point 30 and the ground truth, through the feature point extraction algorithm 181. A loss function related to the difference between the feature point 30 and the ground truth may be obtained, and a result value of the loss function may be minimized, through the feature point extraction algorithm 181. The AI model 180 may be trained according to the minimized loss function.

The pattern optimization algorithm 182 may be an algorithm trained to extract an optimization pattern 122 of the pattern mask optimized to extract a feature point.

For example, a difference between the extracted feature point 30 and a ground truth based on the object image 10 may be obtained through the pattern optimization algorithm 182. A pattern of the pattern mask 1620 may be updated, based on the difference between the feature point 30 and the ground truth, through the pattern optimization algorithm 182. As a result, the AI model 180 may optimize a pattern of the pattern mask 1620 for obtaining an accurate feature point from the coded image 20, through the pattern optimization algorithm 182.

The electronic device 100 may be designed to include an element of a gaze tracking camera system including the pattern mask having the optimization pattern 122. The device including the gaze tracking camera system that is actually designed may be, but is not limited to, an AR device, or an HMD.

The feature point extraction algorithm 181 and the pattern optimization algorithm 182 performed based on the updated pattern mask or the pattern mask having the optimization pattern 122 may be paired with each other. The AI model 180 may be trained by performing the feature point extraction algorithm 181 and at the same time performing the pattern optimization algorithm 182 trained to extract an optimization pattern of a pattern mask optimized to extract a feature point.

Accordingly, for the optimization pattern 122 obtained by the pattern optimization algorithm 182, the feature point extraction algorithm 181 paired with the pattern optimization algorithm 182 may be an algorithm trained to extract an accurate feature point from a coded image that is modulated by the pattern mask having the optimization pattern 122. In contrast, for the optimization pattern obtained by the pattern optimization algorithm 182, a feature point extraction algorithm not paired with the pattern optimization algorithm 182 may not extract an accurate feature point from a coded image that is modulated by the pattern mask having the optimization pattern 122.

Figure 16:
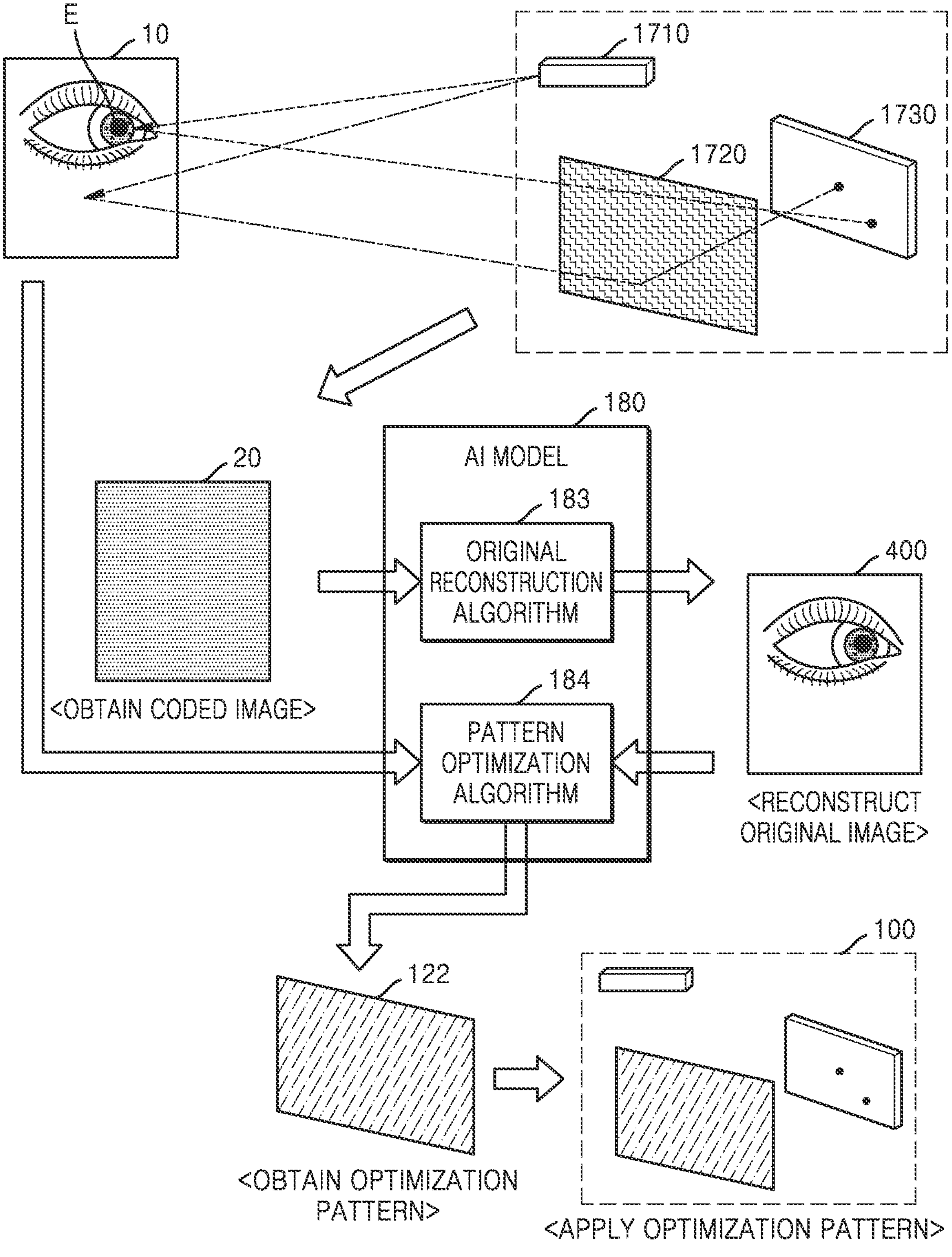
FIG. 16 is a diagram illustrating a method by which an AI model is trained to reconstruct an original image and optimize a pattern based on the original image, according to an embodiment of the disclosure.

FIG. 16 is a diagram illustrating a method by which an AI model is trained to reconstruct an original image and optimize a pattern based on the original image, according to an embodiment of the disclosure.

For reference, unlike in FIGS. 1 to 14, a light source 1710, a pattern mask 1720, and an image sensor 1730 in FIG. 16 may be virtual elements that perform their functions to train the AI model 180.

Referring to FIG. 16, the coded image 20 that is phase-modulated may be obtained, by receiving light transmitted through the pattern mask 1720 through the image sensor 1730 according to an embodiment of the disclosure.

The AI model 180 may be a model trained by performing, through virtual simulation, a process in which light output from the light source 1710 is reflected from an object, transmitted through the pattern mask 1720, and received through the image sensor 1730.

The virtual simulation performed by the AI model 180 may use, for example, ray tracing. That is, the AI model 180 may obtain the coded image 20 by receiving virtual light through the image sensor 1730, using a method of tracking a path of light. However, a method of simulating a path of light is merely an example, and the disclosure is not limited thereto.

The coded image 20 may be obtained using light received by the image sensor 1730, using the virtual simulation. A process of obtaining the coded image 20 is the same as that described with reference to FIG. 8, and thus, will be briefly described.

In an embodiment of the disclosure, the AI model 180 may be a model trained by performing an original reconstruction algorithm 183 and a pattern optimization algorithm 184.

The original reconstruction algorithm 183 may be an algorithm trained to reconstruct an original image from a modulated image. The original reconstruction algorithm 183 may include program code that reconstructs an original image from a modulated image. The original reconstruction algorithm 183 may be program code that reconstructs an original image from a coded image that is phase-modulated by the pattern mask 1720. Accordingly, the electronic device may reconstruct the original image 400 from the coded image 20 using the original reconstruction algorithm 183.

For example, a difference between the reconstructed original image 400 and a ground truth based on the input object image 10 may be obtained through the original reconstruction algorithm 183. The AI model 180 may be trained to reconstruct a more accurate original image from the coded image 20, based on the difference between the reconstructed original image 400 and the ground truth, through the original reconstruction algorithm 183. A loss function related to the difference between the reconstructed original image 400 and the ground truth may be obtained, and a result value of the loss function may be minimized, through the original reconstruction algorithm 183. The AI model 180 may be trained according to the minimized loss function.

The pattern optimization algorithm 184 may be an algorithm trained to extract an optimization pattern 123 of the pattern mask optimized to reconstruct an original image.

For example, a difference between the reconstructed original image 400 and a ground truth based on the input object image 10 may be obtained, through the pattern optimization algorithm 184. A pattern of the pattern mask 1720 may be updated, based on the difference between the original image and the ground truth, through the pattern optimization algorithm 184. As a result, the AI model 180 may optimize a pattern of the pattern mask 1720 for obtaining an accurate original image from the coded image 20, through the pattern optimization algorithm 184.

The electronic device 100 may be actually designed to include a gaze tracking camera system including the pattern mask having the optimization pattern 122. The device including the gaze tracking camera system that is actually designed may be, but is not limited to, an AR device or an HMD.

The original reconstruction algorithm 183 and the pattern optimization algorithm 184 performed based on the updated pattern mask or the pattern mask having the optimization pattern 123 may be paired with each other. The AI model 180 may be trained by performing the original reconstruction algorithm 183 and at the same time performing the pattern optimization algorithm 184 trained to extract an optimization pattern of a pattern mask optimized to reconstruct an original image.

For example, the pattern optimization algorithm 184 may optimize a pattern based on a difference between the original image 400 and a ground truth obtained by the original reconstruction algorithm 183. Because the pattern optimization algorithm 184 is trained using the original image 400 obtained by the original reconstruction algorithm 183 as data, the pattern optimization algorithm 184 may be paired with the original reconstruction algorithm 183.

Accordingly, for the optimization pattern 123 obtained by the pattern optimization algorithm 184, the original reconstruction algorithm 183 paired with the pattern optimization algorithm 184 may be an algorithm trained to reconstruct an accurate original image from a coded image that is modulated by the pattern mask having the optimization pattern 122. In contrast, for the optimization pattern 123 obtained by the pattern optimization algorithm 184, an original reconstruction algorithm not paired with the pattern optimization algorithm 184 may not reconstruct an accurate original image from a coded image that is modulated by the pattern mask having the optimization pattern 122.

An electronic device according to an embodiment of the disclosure may include a light source, a pattern mask, an image sensor, and at least one processor. The light source may be configured to output light. The pattern mask may include a pattern through which light is transmitted to change a path of the light. The image sensor may be configured to receive light output from the light source, reflected by an eye, and transmitted through the pattern mask. The at least one processor may be configured to obtain a coded image that is phase-modulated, using light transmitted through the pattern mask and received through the image sensor. The at least one processor may be configured to obtain a feature point of the eye from the coded image. The at least one processor may be configured to obtain gaze information of a user based on the feature point.

In an embodiment of the disclosure, the feature point may include information about at least one of position coordinates or a shape of the eye.

In an embodiment of the disclosure, the feature point may include at least one of a pupil feature point or a glint feature point.

In an embodiment of the disclosure, the at least one processor may be further configured to reconstruct an original image of the eye from the coded image. The at least one processor may be further configured to obtain authentication information of the user based on the original image.

In an embodiment of the disclosure, the at least one processor may be further configured to identify iris information of the user based on the original image. The at least one processor may be further configured to obtain the authentication information using the identified iris information.

In an embodiment of the disclosure, the at least one processor may be further configured to obtain process determination information based on a situation of the user. The at least one processor may be further configured to selectively obtain the gaze information or the authentication information of the user, based on the process determination information.

In an embodiment of the disclosure, the image sensor may include a TOF sensor configured to obtain depth information by receiving light. The at least one processor may be further configured to obtain the coded image, using light transmitted through the pattern mask and received through the TOF sensor.

In an embodiment of the disclosure, the coded image obtained using the light received through the TOF sensor may include depth information corresponding to an object, and may be an image modulated by the pattern mask.

In an embodiment of the disclosure, the image sensor may include a TOF sensor configured to obtain depth information and a light sensor configured to obtain an image of a target object. The at least one processor may be further configured to obtain a first coded image based on light transmitted through the pattern mask and received through the TOF sensor. The at least one processor may be further configured to obtain a second coded image, based on light transmitted through the pattern mask and received by the light sensor. The at least one processor may be further configured to obtain the feature point, using at least one of the first coded image or the second coded image.

In an embodiment of the disclosure, the at least one processor may be further configured to obtain only the feature point of the eye from the coded image. That is, the at least one processor may directly obtain the feature point from the coded image without reconstructing the original image.

The electronic device according to an embodiment of the disclosure may further include an AI model trained to extract a feature point from an image that is phase-modulated by a pattern. The at least one processor of the electronic device may be further configured to obtain the feature point from the coded image, using the trained AI model.

A method according to an embodiment of the disclosure may include obtaining a coded image that is phase-modulated, using light transmitted through a pattern mask and received through an image sensor. The method may include obtaining a feature point of an eye from the coded image. The method may include obtaining gaze information of a user based on the feature point.

In an embodiment of the disclosure, the feature point may include information about at least one of position coordinates or a shape of the eye.

In an embodiment of the disclosure, the feature point may include at least one of a pupil feature point or a glint feature point.

In an embodiment of the disclosure, the method may further include reconstructing an original image of the eye from the coded image. The method may further include obtaining authentication information of the user based on the original image.

In an embodiment of the disclosure, the obtaining of the authentication information of the user may include identifying iris information of the user based on the original image. The obtaining of the authentication information of the user may include obtaining the authentication information using the identified iris information.

In an embodiment of the disclosure, the obtaining of the gaze information of the user and the obtaining of the authentication information of the user may include obtaining process determination information based on a situation of the user. The obtaining of the gaze information of the user and the obtaining of the authentication information of the user may include selectively obtaining the gaze information or the authentication information of the user, based on the process determination information.

In an embodiment of the disclosure, the image sensor may include a TOF sensor configured to obtain depth information by receiving light. The obtaining of the coded image may include obtaining the coded image, using light transmitted through the pattern mask and received through the TOF sensor.

In an embodiment of the disclosure, the coded image obtained using the light received through the TOF sensor may include depth information corresponding to an object, and may be an image modulated by the pattern mask.

A machine-readable storage medium may be provided as a non-transitory storage medium. 'non-transitory' may indicate that the storage medium does not include a signal and is tangible, but does not distinguish whether data is stored semi-permanently or temporarily in the storage medium. For example, the 'non-transitory storage medium' may include a buffer in which data is temporarily stored.

According to an embodiment of the disclosure, methods according to various embodiments of the disclosure may be provided in a computer program product. The computer program product is a product purchasable between a seller and a purchaser. The computer program product may be distributed in a form of machine-readable storage medium (e.g., a compact disc read-only memory (CD-ROM)), or distributed (e.g., downloaded or uploaded) through an application store or directly or online between two user devices (e.g., smart phones). When distributed online, at least part of the computer program product (e.g., a downloadable application) may be temporarily generated or at least temporarily stored in a machine-readable storage medium, such as a memory of a server of a manufacturer, a server of an application store, or a relay server.

The embodiments of the disclosure disclosed in the specification and the drawings provide merely examples to easily describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic device comprising:

a first light source configured to output first light of a first wavelength;

a second light source configured to output second light of a second wavelength;

a pattern mask configured to phase-modulate light transmitted through a pattern of the pattern mask;

an image sensor configured to receive light that is output from the first light source and the second light source, reflected by an eye, and transmitted through the pattern mask; and at least one processor configured to:

obtain a first coded image that is phase-modulated based on the first light transmitted through the pattern mask, obtain a second coded image that is phase-modulated based on the second light transmitted through the pattern mask;

selectively obtain a feature point of the eye from at least one of the first coded image and the second coded image or reconstruct an original image of the eye from at least one of the first coded image and the second coded image, obtain gaze information of a user based on the feature point, and obtain authentication information of the user if the original image is reconstructed.

2. The electronic device of claim 1, wherein the feature point comprises information about at least one of position coordinates of the eye and a shape of the eye.

3. The electronic device of claim 1, wherein the feature point comprises at least one of a pupil feature point and a glint feature point.

4. The electronic device of claim 1, wherein the at least one processor is further configured to:

identify iris information of the user based on the original image, and obtain the authentication information based on the identified iris information.

5. The electronic device of claim 1, wherein the at least one processor is further configured to:

obtain process determination information based on a situation of the user, and based on the process determination information, selectively obtain the gaze information of the user or the authentication information of the user.

6. The electronic device of claim 1, wherein the image sensor comprises a time of flight (TOF) sensor configured to obtain depth information based on received light, and wherein the at least one processor is further configured to obtain the first coded image, based on the first light transmitted through the pattern mask and received through the TOF sensor.

7. The electronic device of claim 6, wherein the first coded image obtained based on the first light received through the TOF sensor comprises depth information corresponding to the eye, and wherein the first coded image comprises an image modulated by the pattern mask.

8. The electronic device of claim 1, wherein the image sensor comprises a time of flight (TOF) sensor configured to obtain depth information and a light sensor configured to obtain an image of a target object, and wherein the at least one processor is further configured to:

obtain the first coded image based on the first light received through the TOF sensor, and obtain the second coded image, based on the second light received by the light sensor.

9. The electronic device of claim 1, further comprising an artificial intelligence (AI) model configured to extract a feature point from an image that is phase-modulated by the pattern of the pattern mask, and wherein the at least one processor is further configured to obtain the feature point from the first coded image or the second coded image, using the AI model.

10. A method comprising:

obtaining a first coded image that is phase-modulated, based on first light of a first wavelength reflected by an eye and transmitted through a pattern mask and received through an image sensor;

obtaining a second coded image that is phase-modulated, based on second light of a second wavelength reflected by the eye and transmitted through the pattern mask and received through the image sensor;

selectively obtaining a feature point of the eye from at least one of the first coded image and the second coded image or reconstructing an original image of the eye from at least one of the first coded image and the second coded image;

obtaining gaze information of a user based on the feature point, and obtaining authentication information of the user if the original image is reconstructed.

11. The method of claim 10, wherein the feature point comprises information about at least one of position coordinates and a shape of the eye.

12. The method of claim 10, wherein the feature point comprises at least one of a pupil feature point and a glint feature point.

13. The method of claim 10, wherein the obtaining of the authentication information of the user comprises:

identifying iris information of the user based on the original image; and obtaining the authentication information based on the identified iris information.

14. The method of claim 10, further comprising:

obtaining process determination information based on a situation of the user; and based on the process determination information, selectively obtaining the gaze information or the authentication information of the user.

15. The method of claim 10, wherein the image sensor comprises a time of flight (TOF) sensor configured to obtain depth information by receiving light, and wherein the obtaining of the first coded image comprises obtaining the first coded image, based on the first light transmitted through the pattern mask and received through the TOF sensor.

16. The method of claim 15, wherein the first coded image obtained based on the first light received through the TOF sensor comprises depth information corresponding to the eye, and wherein the first coded image comprises is an image modulated by the pattern mask.

17. The method of claim 10, wherein the image sensor comprises a time of flight (TOF) sensor configured to obtain depth information and a light sensor configured to obtain an image of a target object, wherein the first coded image is obtained based on the first light received through the TOF sensor; and wherein the second coded image is obtained based on the second light received through the light sensor.

18. A non-transitory computer-readable recording medium having recorded thereon a program for implementing the method according to claim 10.

19. The electronic device of claim 1, wherein the at least one processor comprises a first processor and a second processor.

20. The electronic device of claim 19, wherein the first processor is configured to obtain the gaze information of the user based on the feature point, and wherein the second processor is configured to obtain the authentication information of the user based on the reconstructed image.

* * * * *